(12) United States Patent
Wong et al.

(10) Patent No.: US 10,887,055 B2
(45) Date of Patent: Jan. 5, 2021

(54) WIRELESS TELECOMMUNICATIONS APPARATUS AND METHODS

(71) Applicant: Sony Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB); Brian Alexander Martin, Basingstoke (GB); Vivek Sharma, Basingstoke (GB)

(73) Assignee: CONVIDA WIRELESS, LLC, Wilmington, DE (US)

( * ) Notice: Subject to any disclaimer, the term of this patent is extended or adjusted under 35 U.S.C. 154(b) by 0 days.

(21) Appl. No.: 16/495,838

(22) PCT Filed: Mar. 20, 2018

(86) PCT No.: PCT/EP2018/057078
§ 371 (c)(1),
(2) Date: Sep. 20, 2019

(87) PCT Pub. No.: WO2018/172382
PCT Pub. Date: Sep. 27, 2018

(65) Prior Publication Data
US 2020/0106557 A1    Apr. 2, 2020

(30) Foreign Application Priority Data

Mar. 22, 2017 (EP) .................... 17162407

(51) Int. Cl.
*H04L 1/08* (2006.01)
*H04B 7/0413* (2017.01)
*H04W 72/04* (2009.01)

(52) U.S. Cl.
CPC ............. *H04L 1/08* (2013.01); *H04B 7/0413* (2013.01); *H04W 72/044* (2013.01)

(58) Field of Classification Search
CPC ....... H04L 5/143; H04L 27/2602; H04L 1/08; H04W 72/0446; H04W 72/044; H04W 72/04; H04B 7/0413
See application file for complete search history.

(56) References Cited

U.S. PATENT DOCUMENTS 6,400,755 B1    6/2002  Harris et al.
2005/0229038 A1  10/2005  Jinzaki et al.
(Continued)

FOREIGN PATENT DOCUMENTS

WO    2018/050431 A1    3/2018

OTHER PUBLICATIONS

International Search Report and Written Opinion dated May 24, 2018 for PCT/EP2018/057078 filed on Mar. 20, 2018, 12 pages.
(Continued)

*Primary Examiner* — Syed Ali
(74) *Attorney, Agent, or Firm* — Xsensus LLP

(57) ABSTRACT

A method of transmitting blocks of data in a wireless telecommunications system in which blocks of data are transmitted a plurality of times. When a first block of data becomes available for transmission an initial selection of transmission resources for a plurality of transmissions of the first block of data in a corresponding plurality of time periods is made, and transmissions of the first block of data are started. While there are still transmissions of the first block of data which remain to be made, a second block of data becomes available for transmission. In response to this, the initial selection of transmission resources for the remaining repeat transmissions of the first block of data is modified to increase the amount of resource available for transmitting the second block of data during the time periods in which repeat transmissions of the first block of data remain to be made.

15 Claims, 11 Drawing Sheets

(56) References Cited

U.S. PATENT DOCUMENTS

| | | | |
|---|---|---|---|
| 2005/0265282 A1 | 12/2005 | Gross et al. | |
| 2010/0135202 A1* | 6/2010 | Chun | H04L 1/1877 |
| | | | 370/328 |
| 2016/0021626 A1* | 1/2016 | Abedini | H04W 4/70 |
| | | | 370/328 |
| 2017/0181159 A1* | 6/2017 | Zacharias | H04L 5/001 |
| 2018/0352511 A1* | 12/2018 | Martin | H04W 52/0212 |
| 2018/0375616 A1* | 12/2018 | Beale | H04L 1/08 |
| 2019/0159183 A1* | 5/2019 | Shimomura | H04J 3/1694 |

OTHER PUBLICATIONS

LG Electronics Inc., "Packet duplication in NR", 3GPP TSG-RAN WG2 NR Ad Hoc R2-1700423, Spokane, USA, Jan. 17-19, 2017, pp. 1-3.

Huawei et al., "UL Grant-free transmission", 3GPP TSG RAN WG1 Meeting No. 88 R1-1701665, Athens, Greece, Feb. 13-17, 2017, 15 pages.

NTT Docomo, "New SID Proposal: Study on New Radio Access Technology", 3GPP TSG RAN Meeting No. 71 RP-160671, Göteborg, Sweden, Mar. 7-10, 2016, 8 pages.

3GPP, "3rd Generation Partnership Project; Technical Specification Group Radio Access Network; Study on Downlink Multiuser Superposition Transmission (MUST) for LTE", Release 13, 3GPP TR 36.859 V13.0.0, Dec. 2015, pp. 1-48.

Holma H. and Toskala A, "LTE for UMTS OFDMA and SC-FDMA based radio access", John Wiley and Sons, 2009, 8 pages.

* cited by examiner

WIRELESS TELECOMMUNICATIONS APPARATUS AND METHODS

CROSS-REFERENCE TO RELATED APPLICATIONS

The present application is based on PCT filing PCT/EP2018/057078, filed Mar. 20, 2018, which claims priority to EP 17162407.5, filed Mar. 22, 2017, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with low latency and high reliability. A single device type might also be associated with different traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

Example use case currently considered to be of interest for next generation wireless communication systems include so-called Enhanced Mobile Broadband (eMBB) and Ultra Reliable and Low Latency Communications (URLLC). See, for example, the 3GPP document RP-160671, "New SID Proposal: Study on New Radio Access Technology," NTT DOCOMO, RAN#71 [1].

eMBB services may be typically characterised as high capacity services, for example, supporting up to 20 Gb/s. For efficient transmission of large amounts of data at high throughput, eMBB services may be expected to use a long scheduling time so as to minimise resource allocation signalling overhead, where scheduling time refers to the time available for data transmission between resource allocations. In other words, eMBB services are expected to rely on relatively infrequent allocation messages that allocate radio resources for higher layer data for a relatively long period of time between allocation messages (i.e. such that radio resources are allocated in relatively large blocks).

URLLC services are low latency services, for example aiming to transmit relatively small amounts of data through the radio network with a 1 ms packet transit time (i.e. so that each piece of URLLC data needs to be scheduled and transmitted across the physical layer in a time that is shorter than 1 ms) with high reliability, for example with a 99.999% reliability target.

Consequently, more frequent messaging opportunities (e.g. shorter transmission time intervals) to reduce latency and a higher degrees of redundancy (e.g. use of repetitions) to increase reliability are generally expected to be desired for supporting some services, e.g. URLLC services, as compared to some other services, e.g. eMBB services.

The inventors have recognized the desire to support increasingly lower latency and higher reliability data transfer in wireless telecommunications systems, and to do so in a manner that makes efficient use of available transmission resources, gives rise to new challenges to be addressed to help optimise the operation of wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
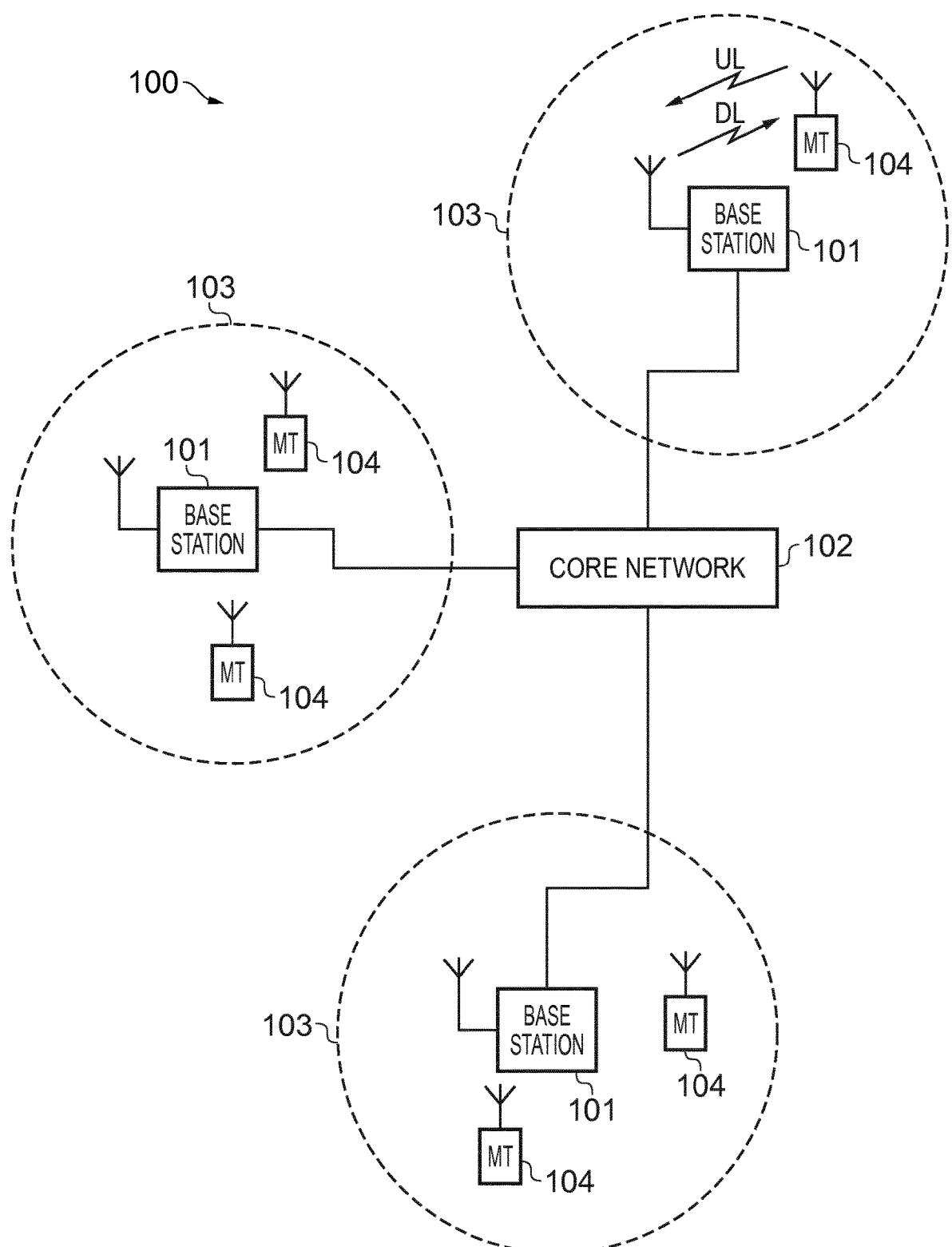
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity particular terminology may be used regardless of the underlying network architecture. That is to say, the use of a specific term in relation to certain example implementations is not intended to indicate these implementations are limited to a certain generation of network that may be most associated with that particular terminology.

Figure 2:
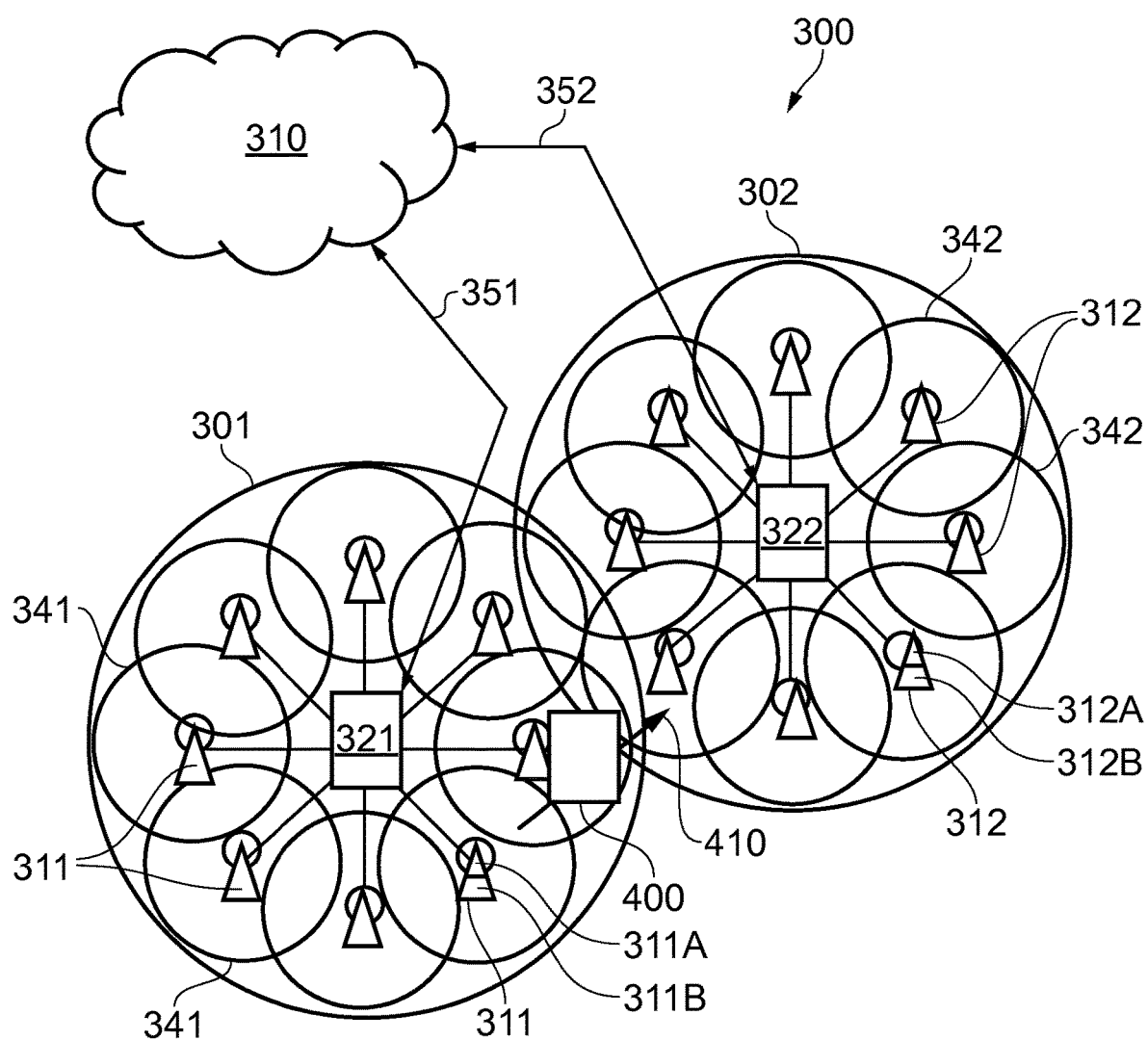
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/element may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment and a terminal device, wherein the specific nature of the network infrastructure equipment and the terminal device will depend on the network infrastructure for the implementation at hand. For example, in some scenarios the network infrastructure equipment may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As discussed above, mobile communications networks such as the network 100 shown in FIG. 1 and the network 300 shown in FIG. 2 may support certain services for which low latency and high reliability are primary concerns (e.g. URLLC). For terminological convenience such services may be generally referred to herein as URLLC services, but it will be appreciated the principles and approaches described herein are not only applicable to specific URLLC services as currently proposed, but are generally applicable, in particular, but not exclusively, to services having the same characteristics as URLLC services in respect of a desire for low latency and high reliability.

To help support relatively low latency with relatively high reliability it may be expected URLLC-type services will be associated with relatively short transmission time intervals (to help reduce latency) and make use of repeat transmissions (to help increase reliability).

Figure 3:
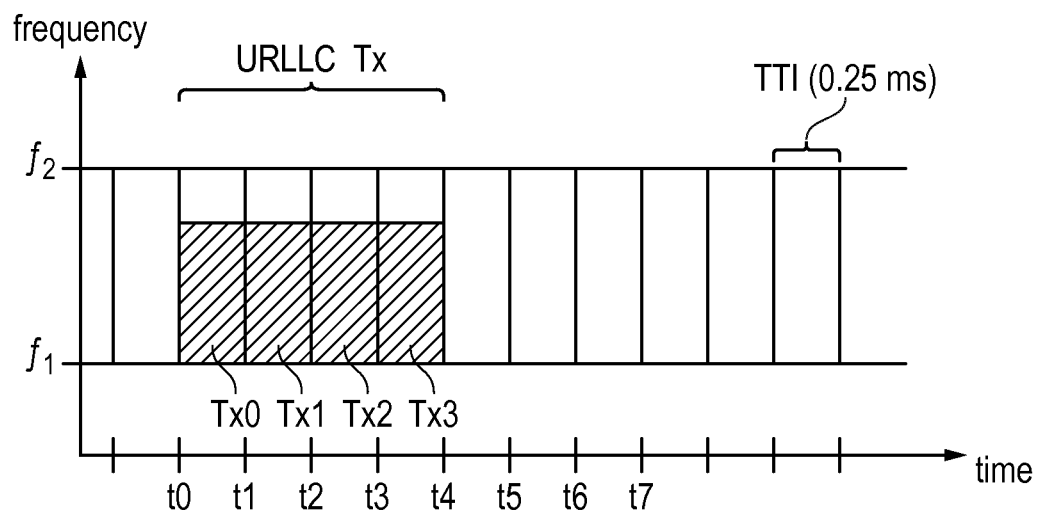
FIG. 3 schematically represents an example of how physical radio resources in a radio resource grid may be used to transmit a block of data for a URLLC service.

FIG. 3 schematically represents how radio transmission resources in a time and frequency radio resource grid may be used for transmitting a block of data associated with a URLLC service in the uplink (i.e. from a terminal device to a base station) in a wireless telecommunications system in accordance with certain embodiments of the disclosure. This figure schematically represent an array/grid of radio resources arranged in time (horizontal axis) and frequency (vertical axis) that may be used to support the URLLC service. For this implementation it is assumed the wireless telecommunications system is configured so the terminal device may autonomously select radio resources from within a frequency range f1 to f2 to use for uplink URLLC transmissions on a grant-free basis (i.e. without requiring advance resource allocation signalling exchange between the terminal device and base station to reserve specific radio resources for the URLLC transmission). However, in some implementations the terminal device may also receive allocation signalling from a base station, for example in a downlink control information, DCI, message to identify radio resources for URLLC transmissions for the terminal device. That is to say, URLLC transmissions associated with terminal devices operating in the system may be made on resources which are autonomously selected by the terminal device from a pool of available resources (grant-free resources) or allocated to the terminal device, e.g. by a base station (allocated resources) according to the situation at hand. For example, a regular predictable URLLC transmission might be made using allocated resources while an irregular unpredictable URLLC transmission might be made using grant-free resources.

It is assumed for this example the radio resource grid for URLLC transmissions is associated with a 0.25 ms transmission time interval (TTI) for a URLLC transport block, and each URLLC transmission nominally comprises four repeats of the transport block (i.e. an initial transmission Tx0, a first retransmission Tx1, a second retransmissions Tx2, and a third retransmission Tx3, as schematically indicated in FIG. 3). In one implementation each 0.25 ms time block may comprise a mini-slot/slot with 7 symbols and a 30 kHz subcarrier spacing. Thus, the duration of a normal (i.e. uninterrupted) URLLC transmission is 1 ms and the URLLC transmission comprises four repeat transmissions of the URLLC data block (packet) being transmitted. The specific manner in which the repeat transmissions convey the data in each time period, for example in terms of the use of different redundancy versions for different (re)transmission may be based on known schemes for enhancing reliability through repetition in wireless telecommunications schemes. The resources used for the URLLC transmission in the different TTIs is schematically represented in FIG. 3 by shading, from which it can be seen that the terminal device does not use all the available transmission resources (i.e. it does not use the full range of frequencies from f1 to f2) in each transmission time interval. That is to say, the terminal device selects a fraction of the total radio resources available in each TTI to use for the URLLC transport block transmission. The fraction/amount of the available radio resources to use in a given TTI may be selected according to circumstances, for example having regard to radio path channel conditions between the terminal device and the base station and a target BLER (block error rate) for the transmissions, and, in accordance with embodiments of the disclosure as described herein, the extent to which resources are also needed to support other URLLC transmissions from the terminal device to the base station at the same time.

It will, of course, be appreciated the specific example of each URLLC transmission nominally comprising four repeat transmissions spanning a 1 ms duration is simply one possible implementation that will be used throughout the present description for the sake of providing a specific example, and in other implementations there may be a different number k of repeat transmissions and/or a different TTI duration T.

The inventors have recognised that while performing repeat transmissions can help improve reliability for URLLC transmissions, it can potentially increase latency for other URLLC transmissions from the same terminal device. For example, referring to FIG. 3, if a second URLLC transmission became available for uplink transmission starting in the TTI starting at t3 (i.e. the TTI associated with the second retransmission Tx2 for the URLLC transmission shown in FIG. 3), and the terminal device wished to transmit the second URLLC transmission using the same amount of resource in each TTI as for the URLLC transmission represented in FIG. 3, there is not enough resource in the available pool between f1 and f2 to do this. Put simply, the URLLC transmission represented in FIG. 3 is using more than half the available resources in each TTI (e.g. as a consequence of current radio channel conditions requiring a relatively low coding rate), which means as it stands there is not enough room for another URLLC transmission using the same amount of resources (e.g. same coding rate) while the existing URLLC transmission is ongoing. If the existing URLLC transmission continues as shown in FIG. 3, the second URLLC transmission will therefore need to be delayed until after the existing URLLC transmission, thereby increasing latency, or will need to be transmitted using fewer resources to match what remains available (e.g., using a higher coding rate), thereby decreasing reliability.

While the example described above in relation to FIG. 3 focuses on an issue that can arise in respect of their being insufficient time and frequency transmission resource elements to fully support a second URLLC transmission during ongoing repetition of a first URLLC transmission, corresponding situations can arise in respect of other transmission resources for which there is a finite amount, for example a terminal device's transmission power budget or MIMO (multiple input, multiple output) stream resources. For example, in some situations a terminal device may have access to sufficient physical resource elements to simultaneously transmit two URLCC transmissions, but may not have sufficient transmission power available to do so.

Certain embodiments of the disclosure are directed to addressing the above-noted potential for sub-optimal performance in respect of the transmission of a second block of data which becomes available for transmission while repeat transmissions for a first block of data are being made.

Figure 4:
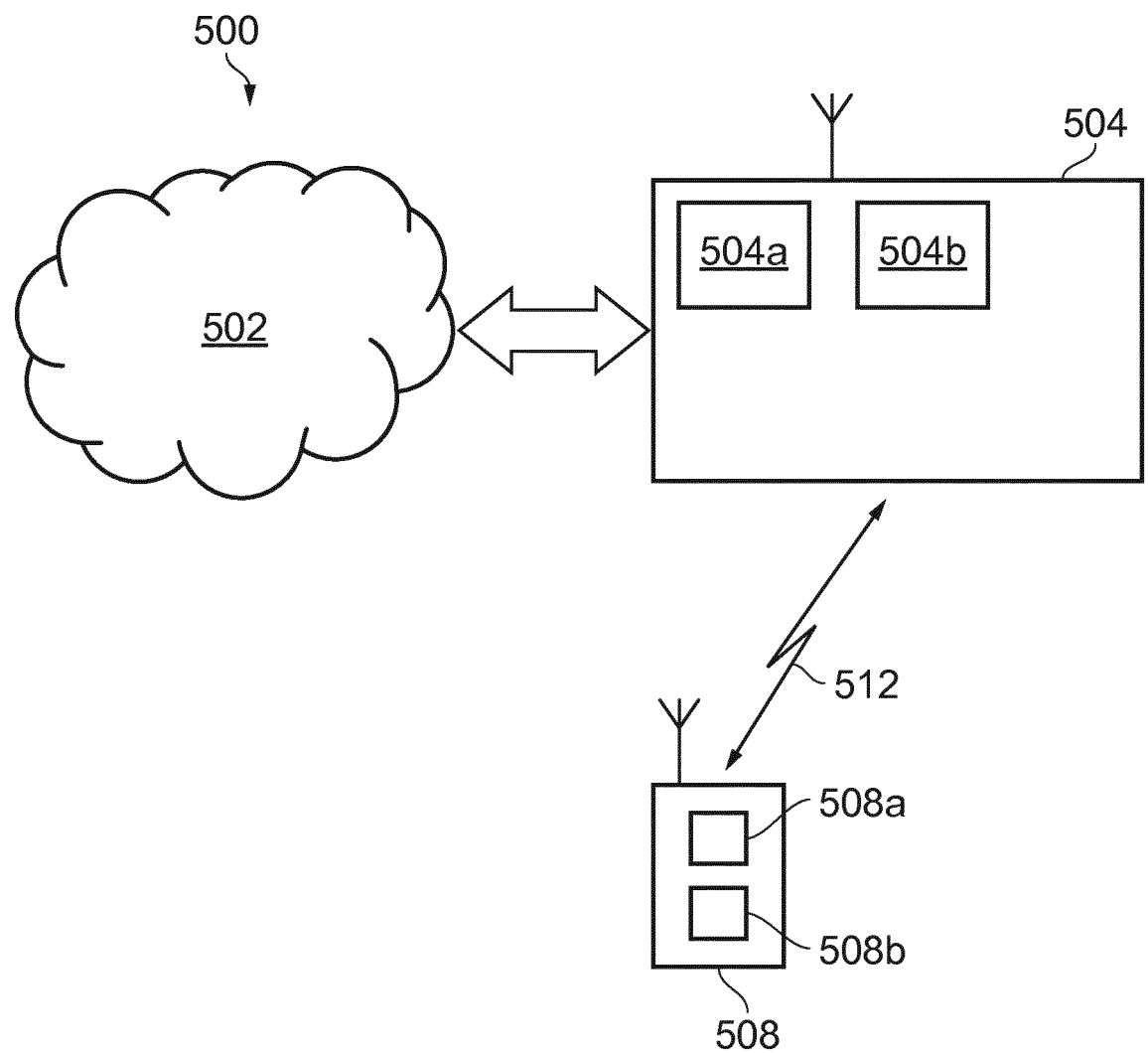
FIG. 4 schematically represents some aspects of a wireless telecommunications system/network configured to operate in accordance with certain embodiments of the present disclosure.

FIG. 4 schematically shows some further details of a telecommunications system 500 according to an embodiment of the present disclosure. For the sake of an example, the telecommunications system 500 here is assumed to be based broadly around an LTE-type architecture that may also support other radio access technologies, either using the same hardware as represented in FIG. 4 with appropriately configured functionality, or separate hardware configured to operate in association with the hardware represented in FIG. 4. However, the specific network architecture in which embodiments of the disclosure may be implemented is not of primary significance to the principles described herein. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a terminal device 508. It will of course be appreciated that in practice the radio network part may comprise a plurality of base stations serving a larger number of terminal devices across various communication cells. However, only a single base station and one terminal device are shown in FIG. 4 in the interests of simplicity.

As with a conventional mobile radio network, the terminal device 508 is arranged to communicate data to and from the base station (transceiver station/network infrastructure equipment) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with terminal devices operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 4 may be in accordance with known techniques apart from where modified to provide functionality in accordance with embodiments of the present disclosure as discussed herein.

In this example the terminal device 508 is a URLLC capable terminal device adapted for transmitting URLLC data to the base station over a radio interface supporting repeat radio transmissions (e.g. as schematically represented in FIG. 3) in accordance with an embodiment of the disclosure. The terminal device 508 may be a generic terminal device, such as a smartphone terminal device, which is running an application that relies on URLLC data. However, the terminal device may in other cases not be a generic smartphone, but may be a device dedicated to an application that uses URLLC data, for example a machine type communications device supporting communication for an autonomous vehicle. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 4 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 4 for simplicity, the processor circuitry 504b may comprise scheduling circuitry, that is to say the processor circuitry 504b may be configured/programmed to provide the scheduling function for the base station.

Thus, the base station 504 is configured to communicate URLLC data with the terminal device 508 over a radio communication link 512.

In accordance with certain embodiments of the disclosure a pool of available transmission resources that is available for transmitting blocks of URLLC data is shared by two (or more) colliding blocks of URLLC data (i.e. blocks of URLLC data being transmitted around the same time) in a manner that takes account of how may transmissions of one or other, or both, have already been made. In summary, in accordance with some examples, the available resources may be preferentially used for supporting transmissions for a data block that has been transmitted fewer times than another data block (to the extent there are not sufficient resources available to support transmissions for both data blocks with an amount of resource that would be selected for use if there were no collision issue).

The pool of available transmission resources that are shared in accordance with certain embodiments of the disclosure may, as discussed further below, comprise one or more of a plurality of frequencies available for transmitting the blocks of data; a plurality of time periods available for transmitting the blocks of data; an amount of power available for transmitting the blocks of data: a plurality of multiple input multiple output, MIMO, configurations (streams) available for transmitting the blocks of data; and a plurality of multiuser superposition transmission, MUST, configurations available for transmitting the blocks of data.

Figure 5:
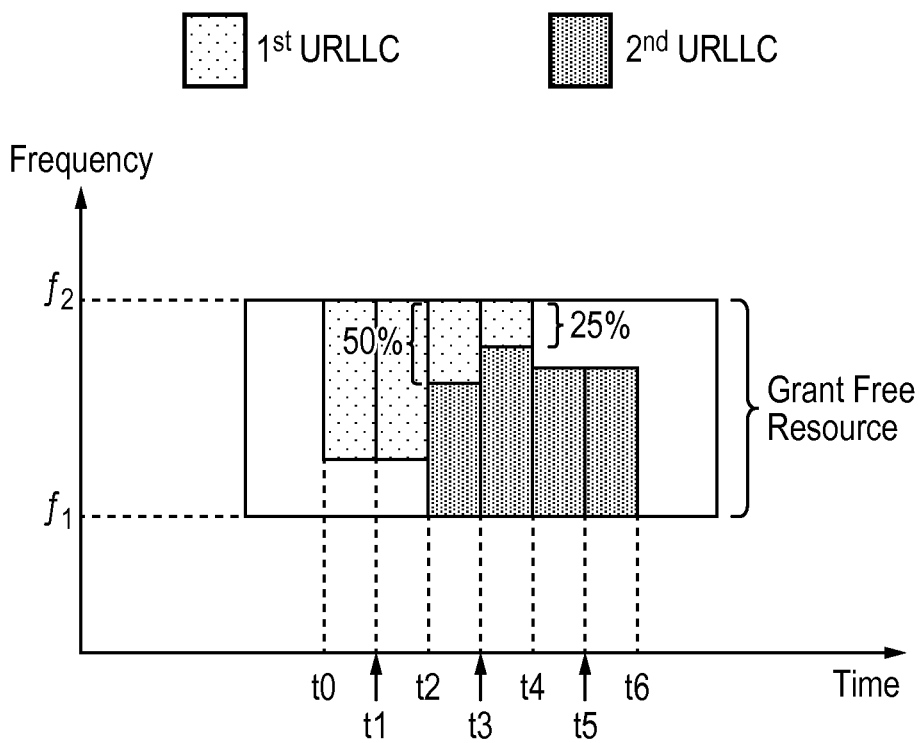
FIGS. 5 to 16 schematically represent different distributions of transmission resources for transmitting first and second blocks of data (in these examples corresponding to first and second URLLC transmissions) in accordance with certain embodiments of the disclosure.

Thus in one example, the available resources may be physical time and frequency resources, i.e. resource elements (RE). An example of this is schematically shown in FIG. 5, which schematically represents how a set of grant-free frequency resources ranging from f1 to f2 that are configured for a terminal device to use for URLLC uplink transmissions may be shared for transmissions associated with a first block of URLLC data (lighter shading labelled first URLLC in the figure) and a second block of URLLC data (heavier shading labelled second URLLC in the figure). It will be appreciated these resources may be available for a number of terminal devices.

The transmissions of the URLLC data blocks represented in FIG. 5 are divided among time periods (transmission time intervals—TTIs) as discussed above with respect to FIG. 3. The start times of the TTIs represented in FIG. 5 (and in the other figures representing series of TTIs as discussed herein) are labelled tn, where n is the number of TTIs after the first TTI containing transmissions for the first URLLC transmission involved in a collision. A TTI starting at tn may sometimes be referred to herein as TTI tn. Each TTI that includes transmissions for a given block of URLLC data supports one transmission of that block of data. Thus with reference to FIG. 5, TTI t0 comprises a first transmission for the first URLLC data block, TTI t1 comprises a second transmission for the first URLLC data block (i.e. a first retransmission), TTI t2 comprises a third transmission for the first URLLC data block (i.e. a second retransmission), and so forth. When there is no collision between URLLC data blocks (e.g. in TTIs t0 and t1 of the first URLLC data block and in TTIs t4 and t5 of the second URLLC data block), the terminal device may select the amount of resource to use for the respective transmissions according to conventional techniques, for example having regard to radio channel conditions, available transmission power and the amount of redundancy required to support a desired level of reliability/BLER. The amount of resource used in each TTI is schematically indicated in FIG. 5 by the extent of the shading in the relevant TTI. As can be seen in FIG. 5, the terminal device uses more than half the available radio resources in TTI t0 and TTI t1 to support the initial transmission and first retransmission of the first URLLC data block. The terminal device may, for example, determine that it should use this amount of resource to meet a target reliability for each transmission having regard to current channel conditions. As discussed above, an issue can arise when the terminal device needs to transmit a second URLLC block of data before it has finished transmitting the first block of URLLC data. In particular, there may not be enough of the available transmission resources remaining to support URLLC transmissions for the second block of data using the amount of data needed to meet a target reliability BLER for transmissions of that data.

To help address this issue in accordance with certain embodiments of the disclosure, the terminal device is configured, in response to determining a second block of data has become available for transmission before a plurality of transmissions of a first block of data are complete, to modify an initial selection of transmission resources for the remaining transmissions of the first block to reduce the amount of transmission resources to be used for transmitting the first block and so increase the amount of transmission resources available for transmitting the second block.

Thus, returning to FIG. 5, at time t0, a first URLLC packet/data block arrives at the terminal device's transmission buffers and is transmitted using the configured grant-free resources. To improve reliability, this URLLC transmission is repeated K=4 times (i.e. there are four transmissions overall, namely an initial transmission at t0 and three re-transmissions at time t1, t2 and t3 respectively). Just before time t2, a second URLLC packet arrives at the terminal device's transmission buffers and is subsequently also transmitted using the grant-free resources. Since there are insufficient grant-free resources to carry both URLLC packets using the desired amount of resources for each, a redistribution of REs is made to compromise on how much resource is used for each data block in a given TTI. In this example, the first URLLC packet is, as noted above, repeated 4 times and each successive repetition is associated with a potential 25% reduction in resources that may be applied if there is a collision. Of course it will be appreciated this example based on 25% reductions is merely one approach, and different reductions may be applied for different orders of repetition in other implementations. More generally, the degree of reduction in the amount of resources for subsequent retransmissions that can be tolerated without too significant an impact on overall reliability in this, and other, examples will depend on the implementation at hand (e.g. taking account of how important the repetitions are to providing the target reliability).

Thus, the first repetition (starting at t1) may be reduced by 25% compared to the initial transmission (starting at t0) if there is a collision. In the example of FIG. 5 there is not a collision in the TTI staring at t1 because the collision does not arise until the next TTI, and so the first repetition (starting at t1) is in this example transmitted using the same amount of resource as the initial transmission.

The second repetition (starting at t2) may be reduced by a further 25% compared to the initial transmission (starting at t0), i.e. by 50%, if there is a collision, which in the example of FIG. 5 there is, and so the second repetition for the first URLLC data block (starting at t2) is in this example is transmitted using 50% of the resources used for the initial transmission (this may be achieved by using a higher coding rate, for example).

The third repetition (fourth transmission) for the first URLLC data block/packet (starting at t3) may be reduced by a further 25% compared to the initial transmission (starting at t0), i.e. by 75%, if there is a collision, which in the example of FIG. 5 there is, and so the third repetition for the first URLLC data block (starting at t3) is in this example transmitted using 25% of the resources used for the initial transmission (this may be achieved by using a higher coding rate, for example).

Repetitions at different code rates may be soft-combined by the receiving entity in accordance with established techniques.

The reduction of resources used for higher order repetitions of the first URLLC data block allow for more resources to be used for the second URLLC data block than would otherwise be the case. In the example of FIG. 5, it is assumed the amount of resources available for the initial transmission of the second URLLC (staring in TTI t2) is still less than would be used if there were not a collision (e.g. a higher than optimal coding rate is still needed for the initial transmission), but the initial transmission of the second URLLC data block makes use of all the remaining available resources. For the second transmission (first retransmission) of the second URLLC data block (staring in TTI t3), all remaining resources in the relevant TTI are used in this example, after which the amount of resources used for transmissions for the second block of URLLC data returns to a level that matches what would conventionally be used to support the URLLC transmissions in the absence of collision. The second URLLC data block need not fully use all the available resources in TTI t3 if it can meet a desired reliability target using fewer resources. However, in this example, the second URLLC packet in the second transmission does use up all the resources available to help compensate for the reduction in resources for the initial transmission.

Since the first URLLC packet has already been transmitted twice before the collision arises, the expectation is the reduced reliability for the individual subsequent retransmissions caused by reducing the amount of resources made available for these retransmissions will have a lower impact on overall reliability for transmitting the first URLLC packet than the impact on overall reliability for transmitting the second URLLC packet if its initial transmission is compromised. Put another way, certain approaches in accordance with the principles described herein recognise repetitions of a URLLC packet are often not required by the receiving entity to decode the packet, but the terminal device transmits the repetitions anyway because it is unaware of whether the receiving entity has successfully received the packet or not. Much of the time, the receiving entity will have successfully received the packet from the initial transmission (and/or an earlier retransmission) and so the receiving entity does not require further repetitions. More generally, the importance of each successive repeat transmission to ensuring successful detection will typically be less than the preceding transmission. Consequently, an acceptable degree of overall reliability may be achieved even with successively increasing reductions to the amount of resources for retransmissions.

In some examples the degree of reduction applied to the amount of resource used for retransmissions of a first data block when a second data block becomes available for transmission may be dependent on the repetition level for the second data block (i.e. how many times, if any, the second data block has been transmitted). For example, a first transmission of the second data block might be made without any reduction to the amount of resource that would have been used for this transmission if there were no collision, and the retransmission of the first data block in this TTI may simply be forced to use only whatever resources remain available. This recognises that the first transmission of a data block has a relatively high probability of being successfully received and decoded at a receiving entity and subsequent repetitions increase this probability marginally. For example, a first transmission might have a 99% probability of being received whilst the combination of a first a second transmissions might have a 99.9% probability of being received. After the first transmission, the resources occupied by the second data block might thus be reduced gradually in each successive repetition (e.g. as discussed above for the first data block).

The degree to which resources of an initial transmission are reduced in a collision situation may take account of a relative priority assigned to the first data block and the second data block. For example: (i) if the first and second data blocks have equal priority, resources used for the first transmission are reduced by 25% per TTI under collision situations; (ii) if the first data block has a higher priority than the second data block, resources used the first transmission are reduced by 10% per TTI under collision situations; (iii) if the first data block has a lower priority than the second data block, resources used the first transmission are reduced by 40% per TTI under collision situations. It will be appreciated these specific reductions are merely examples given for the purpose of explanation. Other reductions for different scenarios may be applied in other implementations.

Figure 6:
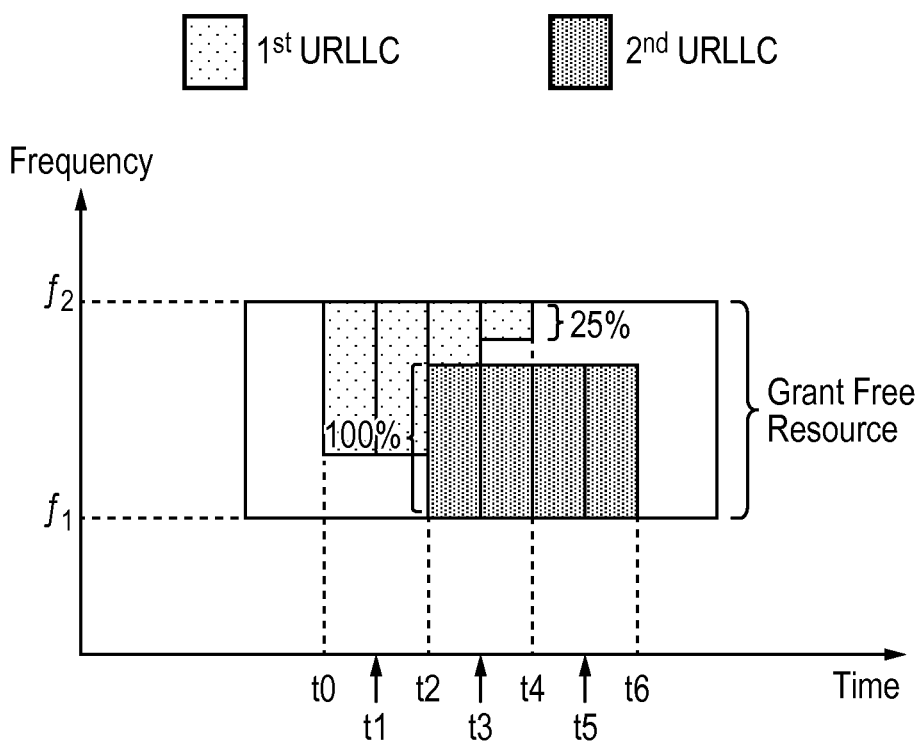

FIG. 6 is similar to, and will be understood from, FIG. 5. FIG. 6 again represents an example in which a first URLLC transmission (with 4 repeats) starts at time t0 whilst a second URLLC transmission (with 4 repeats) starts at time t2, thereby colliding with the repetitions for the first URLLC transmission. Since there are insufficient frequency (RE) resources to support transmissions of both URLLC data blocks in each TTI using the amount of resources that would be used for each if there were no collision, the resources are distributed to preferentially support transmission of the second URLLC data block compared to the first URLLC data block (since the first URLLC data block has had more previous transmissions) in the general manner described above. In the example of FIG. 6 the initial transmission of each URLLC packet is always transmitted in full, i.e. the first transmission of the second URLLC packet is transmitted without any reduction in resources. Thus the terminal device reduces the transmission resources used by the third transmission of the first URLLC data block to whatever level is needed to allow the first transmission of the second URLLC data block to use 100% of the resource that it requires (i.e. the amount of resources it would have selected for use if there were no collision). The second transmission of the second URLLC data block might be made with reduced resources if necessary, but in this example the amount of resources used for the transmission of the first URLLC data block is reduced by 75% in accordance with the principles discussed above in relation to FIG. 5, and so in fact in this case there is sufficient remaining resources to transmit the second (and subsequent) transmissions of the second URLLC data block without reducing the amount of resources used below what would be selected for use if there were no collision.

In another example the available resource that needs to be distributed might be an available transmission power for the terminal device instead of, or in addition to, physical time and frequency resources. A terminal device at cell edge may not have sufficient power to fully transmit more than one simultaneous URLLC TB (transport block), and hence a distribution of transmission power may be appropriate. The general principles set out above in relation to sharing an amount of transmission resource comprising a plurality of time and/or frequency resources may thus be applied broadly in the same way in relation to sharing an amount of transmission resource comprising a transmission power budget. Thus in some examples the power used for transmitting a first URLLC data block may be increasingly reduced (if necessary) for each successive repetition in accordance with the general principles discussed above in relation to FIG. 5 (albeit in relation to a different kind of transmission resource). Furthermore, in a manner mirroring the principles discussed above in relation to FIG. 6, in some examples a first/initial transmission for a data block might be always transmitted using full power with remaining repetitions being transmitted with a reduced power (if necessary), for example where the reduction in power is a percentage of the initial full power (e.g. 25%) for each successive repetition. In this regard it will be appreciated full power need not correspond with the absolute maximum power the terminal device is physically capable of transmitting, but may be a level the terminal device would use for an URLLC transmission if there were not a collision, for example having regard to a target BLER (block error rate) for the transmission and/or any other constraints, such as a requirement to not cause too much interference for other terminal devices operating in the network.

Figure 7:
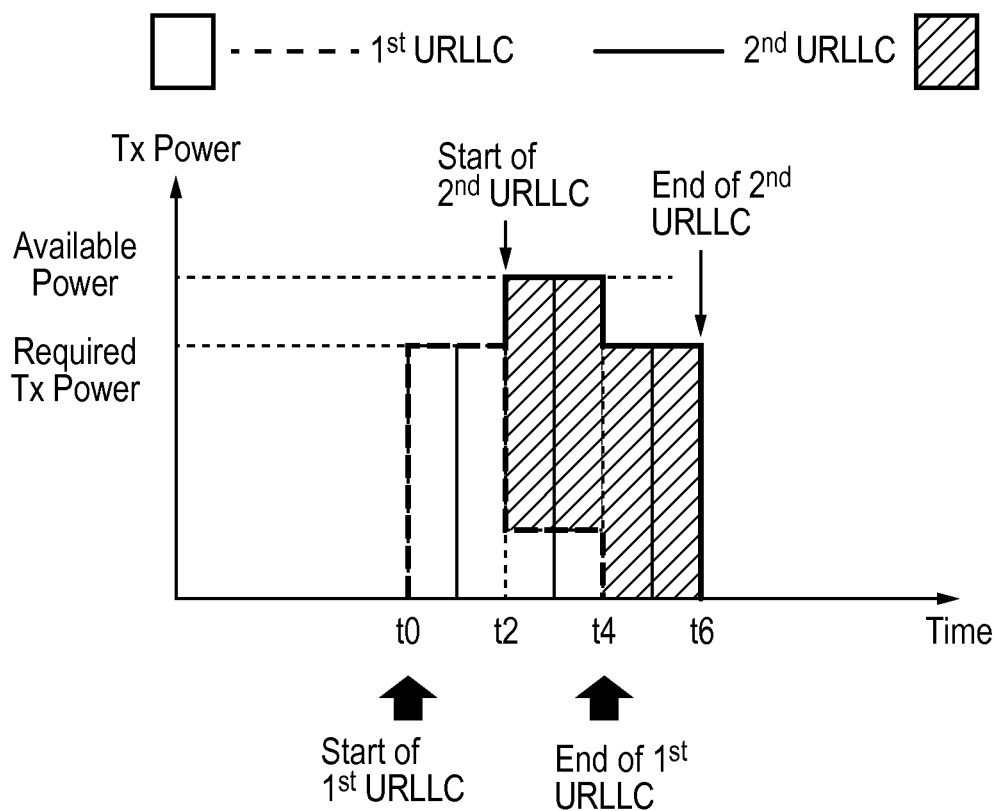

An example approach based on power sharing is represented in FIG. 7 which schematically represents the amount of transmission power used for transmitting a first URLLC data block (area shown with no shading and dotted outline) and a second URLLC data block (area shown with shading and solid outline). The horizontal axis represents time, and the vertical axis represents transmission power. The available transmission power that may be physically transmitted by the terminal device is marked "Available Power" and the full ("Required") transmission power for an uplink transmission (i.e. the transmission power that would normally be used when there is no collision) is also marked. As in the other examples, it is assumed here a first URLLC transmission/repetition starts at time t0 with its four repetitions ending at time t4 while a second URLLC transmission/repetition starts at time t2. In this example there is insufficient power in the terminal device's power budget to transmit both URLLC at their full (required) transmission powers simultaneously. In this example, during the times at which both URLLC data blocks are transmitted (i.e. in the TTIs starting at t2 and t3), the available transmission power is preferentially allocated to the transmission of the second URLLC data block since this is the one with fewer previous transmissions. It may be noted that during the period of simultaneous transmission of the first and second data blocks, the frequency resources used by the overlapping URLLC transmissions do not necessarily need to be re-assigned. For example, if the frequency resources used by the two transmissions are orthogonal (e.g. use separate sets of subcarriers), then both of sets of frequency resources can be transmitted at the same time, albeit with the redistribution of transmit power.

It will be appreciated a power distribution approach of the kind represented in FIG. 7 may be used in addition to a time/frequency resource element distribution approach of the kind represented in FIGS. 5 and 6 if both power and RE resources are limited.

Figure 8:
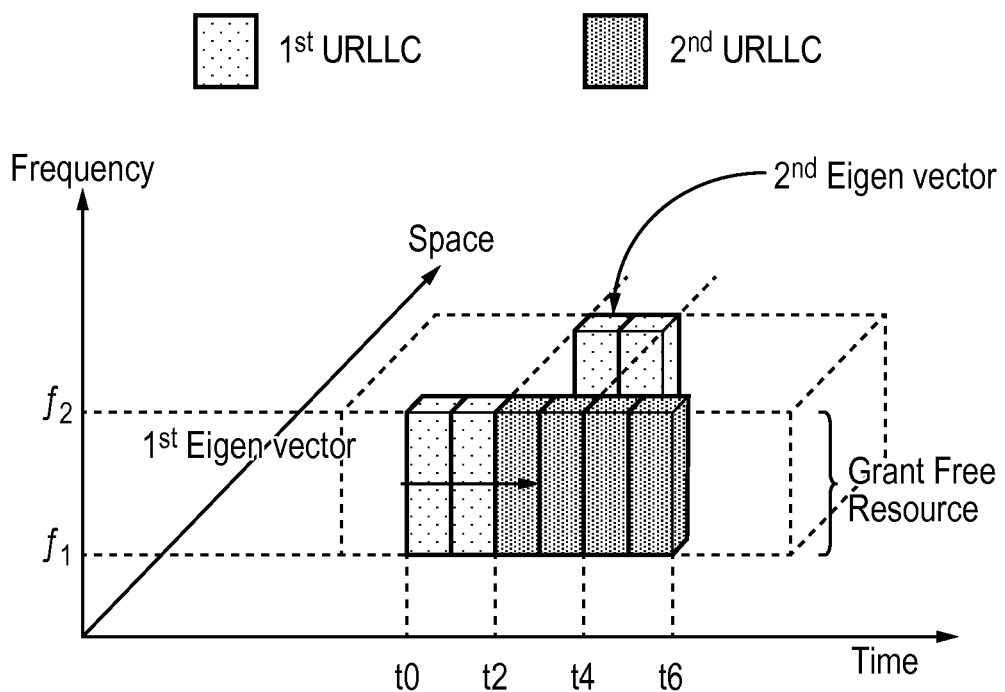

In another embodiment the available resources that need to be shared may be MIMO resources (e.g. available MIMO streams). For a scenario where the configured grant-free resource is sufficient for one URLLC transmission, the different URLLC transmissions can be transmitted using different MIMO streams. When there is a collision, the first URLLC packet that has already made some repetitions can use the weaker MIMO stream, i.e. one with a weaker Eigen value, whilst the second URLLC packet can use a stream with a stronger Eigen value. An example of this type of approach is shown in FIG. 8. FIG. 8 is in some respects similar to, and will be understood from FIGS. 5 and 6, but in addition to representing time and frequency axes for the available physical resource elements, also represents a space axis representing available MIMO configurations.

In the example represented in FIG. 8, a first URLLC packet with four repeats starts to be transmitted at time t0 followed by a second URLLC transmission with four repeats starting at time t2. Since the configured grant-free resource is sufficient to transmit only a single URLLC TB, the two URLLC TBs are transmitted using MIMO. The first URLLC packet is initially (i.e. in TTIs t0 and t1 when there is no collision) transmitted using the MIMO stream with the strongest Eigen value, namely Eigen vector 1 (1st Eigen vector) as schematically indicated in FIG. 8. Once the second URLLC data block transmission begins, the first URLLC data block has already had two transmissions and is transferred to using the second Eigen vector (corresponding to a weaker stream), whilst the second URLLC making its first transmission uses the first (stronger) Eigen vector. It should be appreciated that this, and other, embodiments can be further expanded to more than two URLLC transmissions, where if a later third URLLC transmission occurs, the first transmission of the third URLLC transmission may use the first Eigen vector, the second URLLC transmission may uses the second Eigen vector and the first URLLC transmission uses a weaker still third Eigen vector.

Thus, FIG. 8 represents another approach in which an amount of the available transmission resources used for transmitting later repetitions of a first block of data is reduced to allow more transmission resources to be used for transmitting initial transmissions of a second block of data. In that sense, it will be appreciated the term "amount of resource" does not necessarily relate to numerical amount of a countable resource, but may also relate to the quality of a resource—i.e. its ability to convey data. Thus using a weaker MIMO stream may be considered as corresponding to using a reduced amount of available transmission resource as compared to using a stronger MIMO scheme (e.g. the amount of available transmission resource corresponds to the strength of the MIMO configuration).

In another example, transmissions from a MIMO-capable terminal device may be performed without MIMO unless two packets need to be transmitted at the same time. When two packets are to be transmitted at the same time, later repetitions of a first URLLC transmission may use the weaker MIMO stream while simultaneous initial transmissions/repetitions of a second URLLC transmission may use a stronger MIMO stream.

Figure 9:
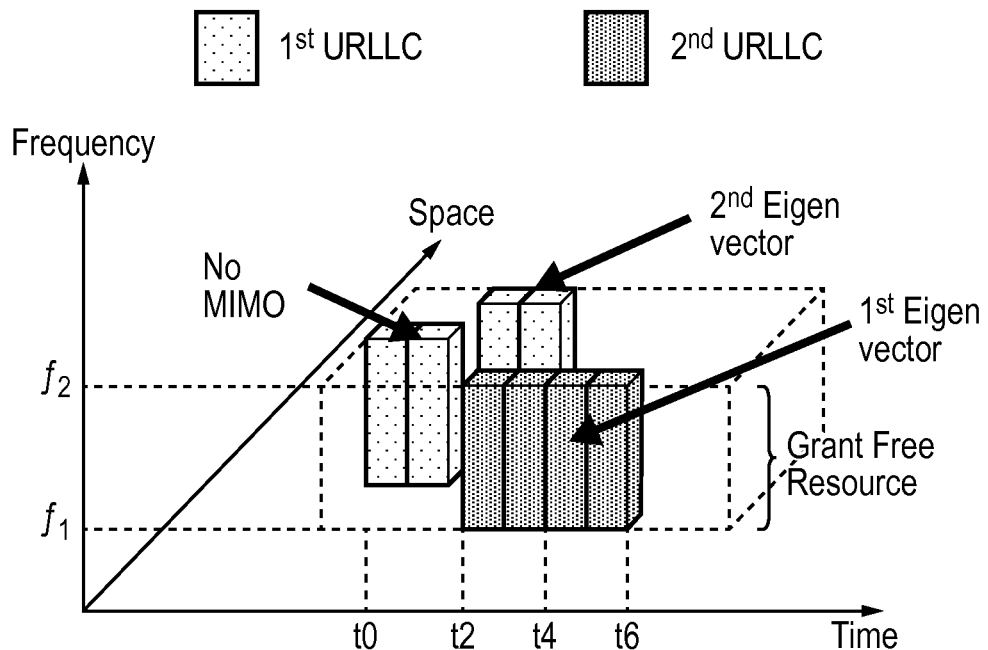

An example in which this approach is used is schematically shown in FIG. 9, which is similar to, and will be understood from, FIG. 8. Referring to FIG. 9, between t0 and t2, while there is no collision, the first URLLC packet is transmitted without MIMO. At time t2, a second URLLC packet becomes available for transmission in the terminal device's transmission buffers. The second URLLC packet is then sent on a stronger MIMO stream (associated with the first Eigen vector) while the re-transmissions of the first URLLC packet are transmitted on the weaker MIMO stream (associated with the second Eigen vector). At time t4, the re-transmissions of the first URLLC packets are complete, and the subsequent repetitions for the second URLLC packet may continue to be transmitted on the same MIMO stream, or may be switched to transmission without the MIMO.

In another example using MIMO transmissions, the first transmission/repetition of a URLLC packet might always be transmitted without MIMO, while subsequent retransmissions may use MIMO, with the strongest streams being used for transmitting data blocks that have been previously transmitted the fewest number of times. Thus, in a modification of the example represented in FIG. 9, in the TTI starting at time t2 (i.e. for the first transmission of the second data block), rather than have the initial transmission of the second data block transmitted on the stronger MIMO steam and the repeat transmission of the first data block transmitted on the weaker MIMO stream, instead the initial transmission of the second data block may be transmitted without MIMO, and the repetition of the first data block in the TTI starting at t2 in FIG. 9 may be missed (i.e. not transmitted at all). The second transmission of the second URLLC data block and the 3rd transmission of the first URLLC data block may then be transmitted in the TTI starting at t3 using MIMO where the second URLLC uses the stronger MIMO stream.

It will be appreciated that in a modification of the above-described approaches making use of MIMO transmissions in which some transmissions are made without MIMO, the transmissions made without MIMO could instead be made using all available MIMO resources (i.e. single user-MIMO transmitting two streams simultaneously).

In another example, when a first URLLC data block and a second URLLC data block are to be transmitted but there is only sufficient resource for one uncompromised URLLC data block transmission, the respective URLLC data blocks may be transmitted using MUST (Multiuser Superposition Transmission—see the 3GPP document TR36.859: Technical Specification Group Radio Access Network; "Study on Downlink Multiuser Superposition Transmission (MUST) for LTE"; (Release 13), November 2015 [3]). Thus the first URLLC data block (i.e. the one having had the most previous transmissions) may be transmitted at a lower power than the second URLLC data block when both are transmitted together. At the receiving entity Successive Interference Cancellation techniques may be employed to recover the respective URLLC transmissions (once the first URLLC data block has been successfully received by the receiving entity, it can be simply cancelled from the MUST processing). It will be appreciated that in this example, the MUST transmission scheme is applied to a single user (i.e. one URLCC transmission acts as one virtual user of the Multiuser Superposition Transmission scheme and the other URLLC transmission acts as another virtual user of the MUST scheme).

Figure 10:
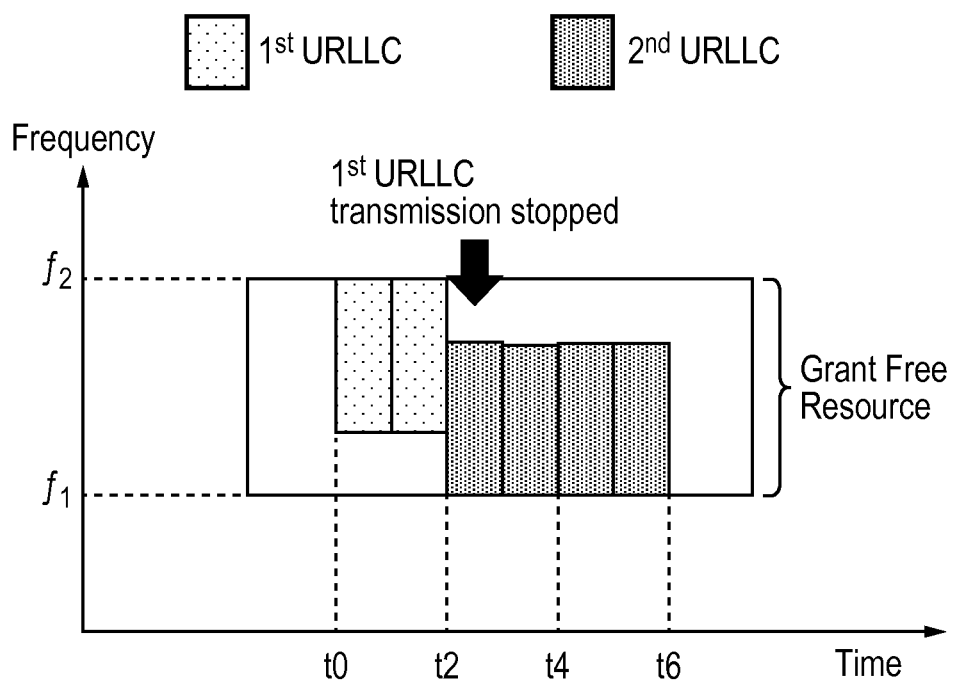

In another example, the when a second URLLC data block becomes available for transmission before all repeated transmissions of a first URLLC data block have completed, the repetition of the first URLLC transmission might simply be stopped. That is to say, the reduction in resources for the retransmissions of the first data block may be a complete reduction/termination. An example of this approach is schematically shown in FIG. 10, which is similar to, and will be understood from, the other figures discussed above. Thus a first URLLC transmission starts at time t0. At time t2, the second URLLC packet becomes available for transmission and the repetition of the first URLLC transmission is stopped. That is to say, the repetition of a URLLC transmission may be terminated early if another URLLC transmission in the same terminal device needs transmitting. A re-transmission of the first URLLC transmission can be scheduled by the base station if the first URLLC transmission is incorrectly received (and the base station will have had time t0 decode the first URLLC transmission and prepare an ACK/NACK response during the time taken for the terminal device to transmit the second URLLC transmission).

The above-described embodiments have focused on approaches in which the resources for transmitting the first data block and the second data block are selected autonomously by the terminal device (i.e. from the available grant-free resources). However, it will be appreciated similar principles can be applied in situations in which the resources used for transmitting at least one of the data blocks are granted resources in the sense of the terminal device being provided with an indication of the resources to use by the receiving entity, for example in conjunction with a conventional downlink control information, DCI, message. For example, in one scenario a first URLLC transmission may be transmitted on grant-free resources, and if the terminal device receives a DCI indicating another URLLC transmission whilst the repetition of the first URLLC transmission is ongoing, this DCI may be taken to implicitly also indicate that the first URLLC repetition is to be terminated. This approach is based on the recognition that a scheduling message for a (granted) URLLC transmission from the receiving entity may indicate the receiving entity is likely to have already received the first URLLC transmission so that subsequent repetitions are not necessary.

Figure 11:
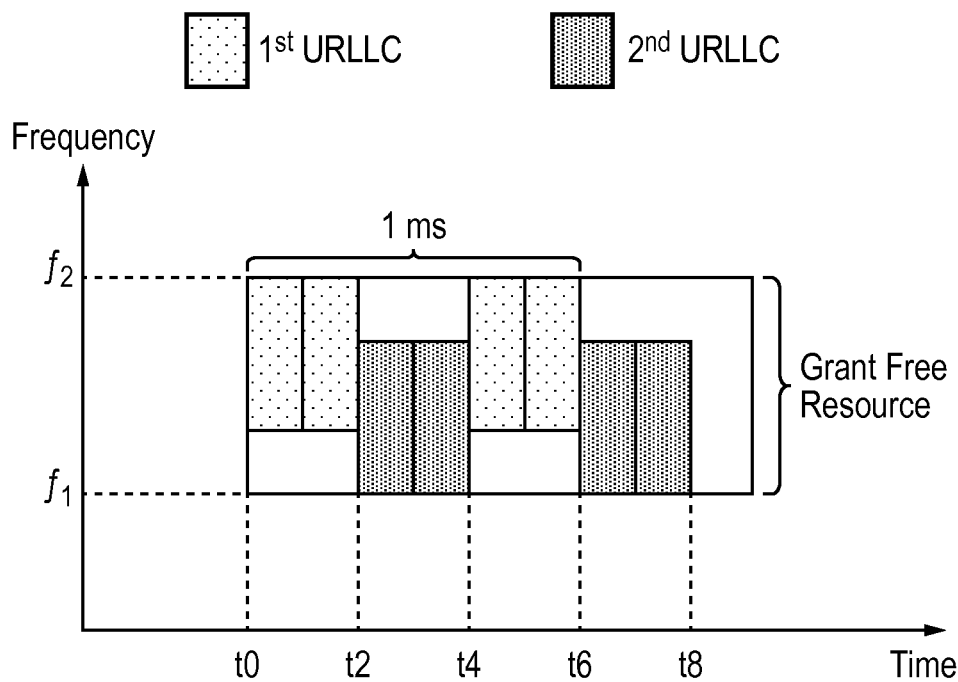

In another example, time interleaving may be applied to the at least two URLLC transmissions. For example, for scenarios where the K repetitions of a given URLLC data block, do not completely fill up the targeted latency (e.g. 1 ms), it is possible to interleave the transmissions for the two URLLC data blocks. An example of this is shown in FIG. 11, where once again a first URLLC packet is transmitted at time t0 with a targeted K=4 repetitions. At time t2, a second URLLC packet is transmitted and here the repetitions for the first URLLC packet are paused and resumed at time t4 after the second URLLC transmission has had two transmissions. The first URLLC packet may then complete its 4 repetitions starting at time t4, after which the second URLLC continues the remainder of its repetitions, starting at t6. Of course it will be appreciated such interleaving can be done on a single TTI, rather than pair of TTIs, basis (or higher groupings in scenarios with more repetitions).

Figure 12:
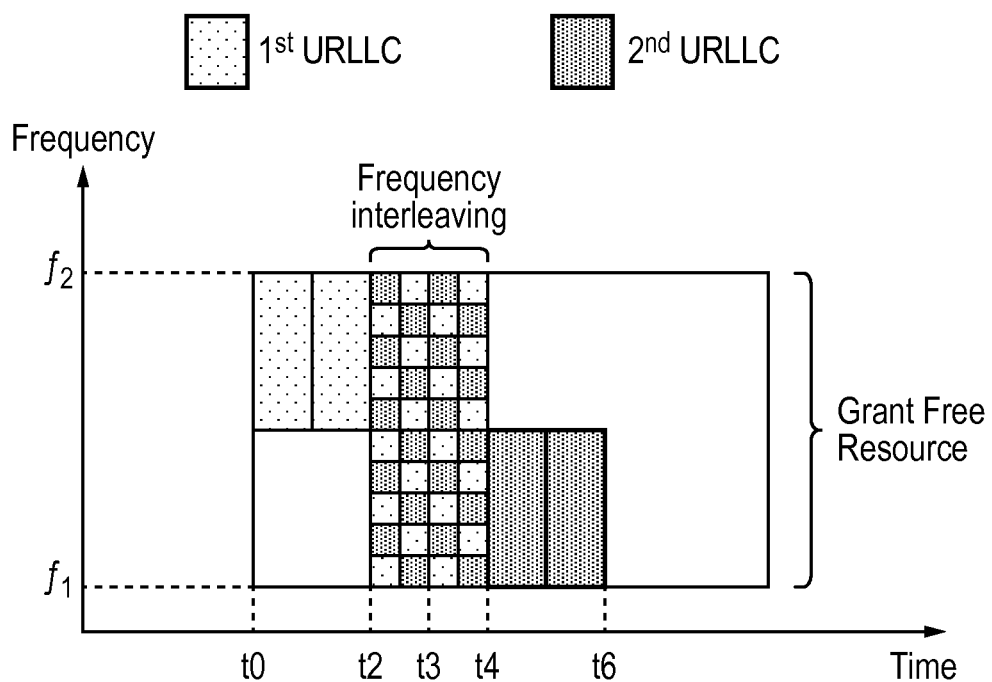

In another example, interleaving in frequency may be performed for simultaneous URLLC transmissions. This may be applicable even if there are sufficient resources to carry the at least two URLLC transmissions fully. This allows for frequency diversity in the transmission. An example is shown in FIG. 12, where a first URLLC packet is transmitted at time t0 and at time t2, the second URLLC packet is transmitted. For the second URLLC packet's repetitions that coincide with those of the first URLLC packet, frequency interleaving is performed, where the REs between the two URLLC transmissions are interleaved and spread across the frequency resources occupied by both URLLC transmissions. The percentage of REs occupied by each URLLC transmission during the period of interleaving may be based on the above-described approaches for sharing the available resources (e.g. as shown in FIGS. 5 and 6). Once the first URLLC repetition ends, the second URLLC transmission may continue to be transmitted without interleaving.

Figure 13:
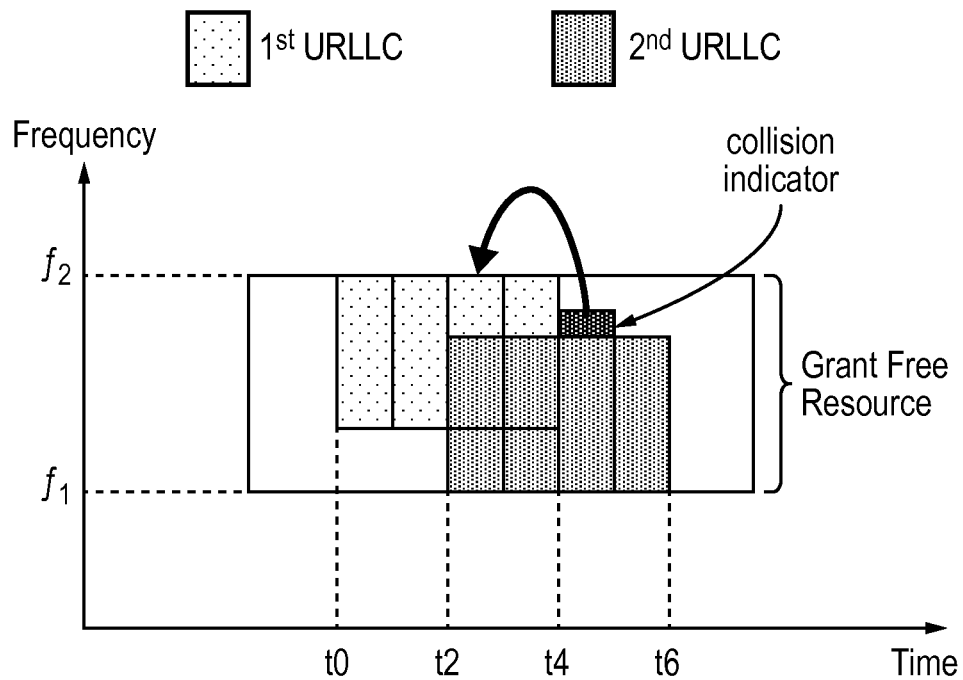
Figure 14:
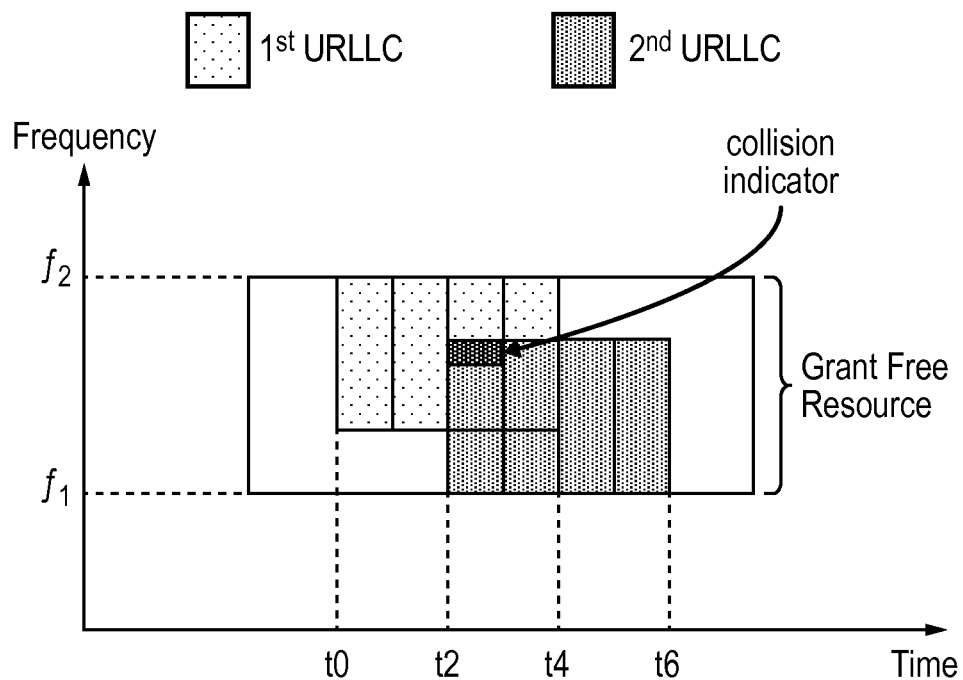

In another example an indicator may transmitted by the terminal device to the receiving entity to indicate when there is URLLC collision. This indicator may thus be used to inform the receiving entity that an amount of transmission resource for repetitions of a data block (e.g. in terms of the physical resources used, MIMO transmission characteristics (e.g. Transmission Mode, MIMO stream), early termination or interleaving) for the first URLLC data block have changed (typically being reduced) due to the transmission of a second URLLC data block. The collision indicator may be transmitted after completion of the transmissions for the first data block and indicate when the change occurred, for example as schematically represented in FIG. 13, or may be transmitted at the start of the transmissions on the second data block, for example as schematically indicated in FIG. 14. In some implementations it may be expected each URLLC transmission occupies a different HARQ process and so the indicator could also be used to indicate to the receiving entity the HARQ process occupied by each of the URLLC data blocks.

The manner in which the indicator is transmitted may be based on broadly conventional signalling techniques For example, the indicator may be transmitted as part of a second URLLC transmission (or first URLLC transmission), e.g. as a header, or it can be transmitted using an independent physical channel (e.g. PUCCH), as independent UCI (Uplink Control Information) or on a new control channel. Transmitting the indicator at the start of the second URLLC transmission (e.g. as schematically represented in FIG. 14) would enable the receiving entity to soft combine the first URLLC repetitions that coincide with the second URLLC transmission immediately rather than after all of the first URLLC repetitions are completed.

The receiver entity (e.g. a base station) may thus determine from the indicator that an initial selection of resources to use for transmitting the first block of data has been modified, and may adapt its receiver processing accordingly (for example to take account of a difference in coding scheme/a difference in the selected resources used by the terminal device for repetitions of a first block of data). In some example implementations a terminal device may convey to the receiver entity that there has been a modification to the initially selected resources through use of a specific signature sequence or preamble transmitted in association with the respective transmissions/repeat transmissions. Thus, in one implementation, the base station may be configured to determine the two different signature sequences to identify respective transmissions from the terminal device. In some implementations the terminal device might not transmit any indicator of the modified selection of transmission resources, in which case the base station may be required to simply apply a blind detection scheme to detect the different transmissions.

Figure 15:
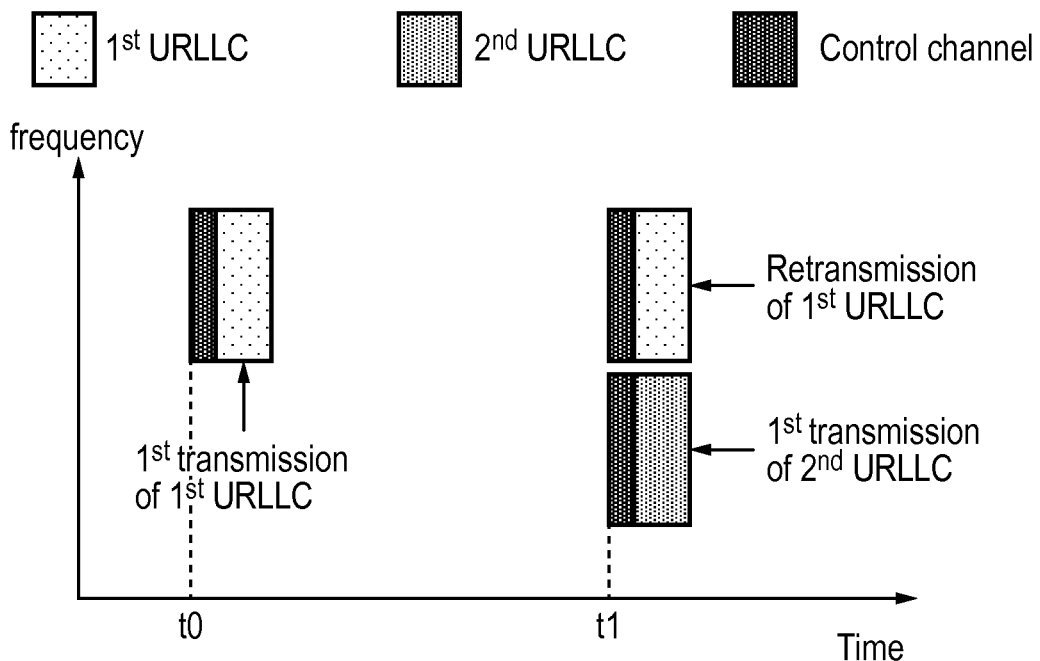
Figure 16:
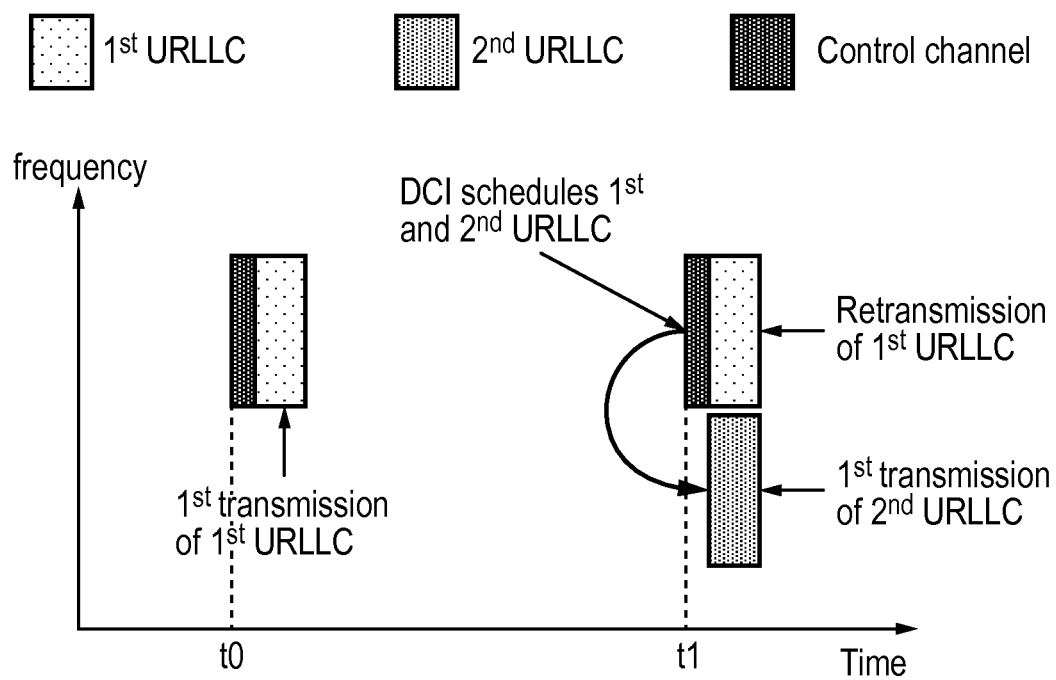

While the above-described examples are mainly focussed on uplink URLLC transmissions, it is recognised that two URLLC packets for the same terminal device may also occur in downlink. For example FIG. 15 represents a scenario in which a base station transmits a first downlink URLLC packet (represented by light shading in FIG. 15) to a terminal device at time t0. It is assumed a NACK is received from the terminal device and so at t1, the base station schedules a retransmission of the first URLLC packet. At the same time a second URLLC transmission (represented by medium shading in FIG. 15) is scheduled to the same terminal device, thereby leading to more than two URLLC transmissions at the same time. Each transmission may be scheduled using control channel signalling (represented by heavy shading in FIG. 15). In this case a DCI message for the repeat transmission of the first data block may contain different information to a DCI message for the initial transmission of the first data block. For example, the DCI message for a repeat transmission might not contain some information relating to characteristics of the data block that remain the same, for example transport block size, and a terminal device receiving the data may simply use the relevant information from the previous DCI message for the initial transmission of the first data block. Hence the DCI message for the repeat transmission of the first data block may use a different (and more compact) DCI format than the DCI message for the initial transmission of the first data block. In a variation of the approach represented in FIG. 15, and as schematically represented in FIG. 16, the control channel allocation signalling associated with a retransmission of the first URLLC data may also schedule resources for the initial transmission of the second URLLC data. That is to say, the DCI scheduling for the retransmission of the first data may also schedule the transmission of the second data such that a single DCI is transmitted to schedule at least two URLLC transmissions. As represented in FIG. 16, at time t1, the control channel, such as a PDCCH in an LTE context, carries a DCI that schedules the retransmission of the first URLLC packet and schedules the first transmission for the second URLLC packet. In another variation, an approach similar to that represented in FIG. 16 is applied, but control channel signalling associated with the initial transmission of the second data block is used to schedule a retransmission of the first data block (i.e. it may be the retransmission of the first data block that does not have its own DCI rather than the initial transmission of the second data block as represented in FIG. 16). In one example a single bit in a field in the DCI for the initial transmission of the second data block may be used to tell the terminal device that a retransmission of the first URLLC packet is being scheduled (e.g. using corresponding transmission characteristics to the initial transmission), while the remaining fields in the DCI may be used for scheduling the second URLLC packet.

Figure 17:
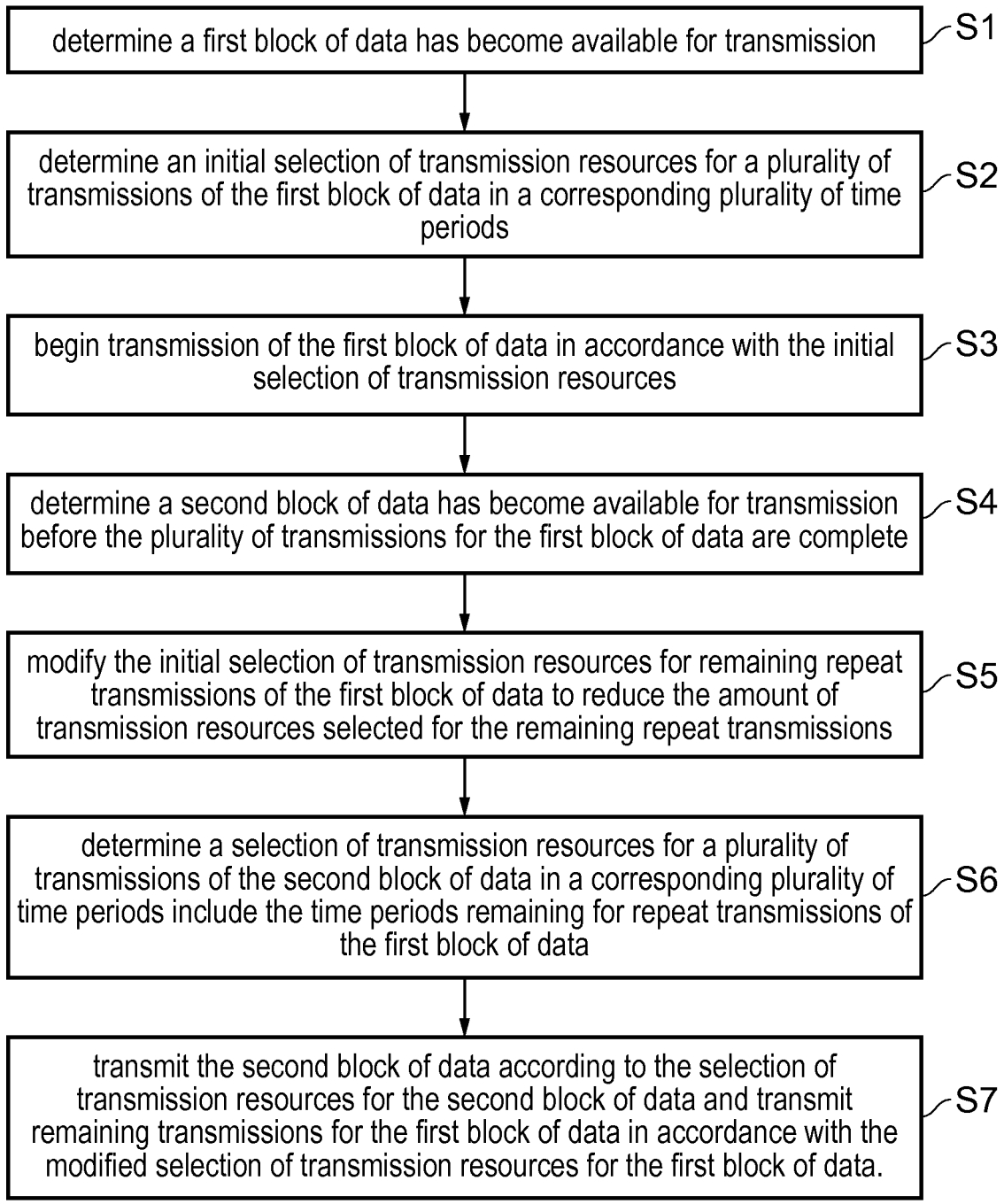
FIG. 17 is a flow diagram schematically representing some aspects of operation in a wireless telecommunications system in accordance with certain embodiments of the present disclosure.

Thus to summarise some of the above described approaches, FIG. 17 is a flow diagram schematically representing some aspects of operation in a wireless telecommunications system in accordance with certain embodiments of the present disclosure.

In step S1 a terminal device determines a first block of data has become available for transmission. The reason why the data has become available for transmission, and the content of the data, is not significant to the principles described herein.

In step S2, the terminal device determines an initial selection of transmission resources for a plurality of transmissions of the first block of data in a corresponding plurality of time periods. This selection may be made having regard to conventional scheduling considerations in wireless telecommunications systems.

In step S3 the terminal device begins transmission of the first block of data in accordance with the initial selection of transmission resources.

In step S4 the terminal device determines a second block of data has become available for transmission before the plurality of transmissions for the first block of data are complete. Again, the reason why the data has become available for transmission, and the content of the data itself, is not significant to the principles described herein.

In step S5, the terminal device modifies the initial selection of transmission resources for remaining repeat transmissions of the first block of data to reduce the amount of transmission resources selected for the remaining repeat transmissions.

In step S6, the terminal device determines a selection of transmission resources for a plurality of transmissions of the second block of data in a corresponding plurality of time periods include the time periods remaining for repeat transmissions of the first block of data.

In step S7, the terminal device transmits the second block of data according to the selection of transmission resources for the second block of data and transmit remaining transmissions for the first block of data in accordance with the modified selection of transmission resources for the first block of data.

Thus, various approaches have been described for addressing issues that can arise when needing to repeatedly transmit different data blocks around the same time when there are limited resources available for doing this. The specific examples have been described in the context of a URLLC data service, but it will be appreciated the same principle can be adopted regardless of the nature of the data and the service associated with the data.

It may be noted various example approaches discussed herein may rely on information which is predetermined/ predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling.

In a variation of the above described approaches in which resources allocated for use for retransmissions of uplink data are reduced in successive repetitions in cases of collision, in some implementations a terminal device may be configured to reduce the amount of resource allocated for use for retransmissions of uplink data in successive repetitions of a block of data regardless of whether there is any collision. For example, a terminal device may be configured to taper off, or otherwise reduce, the resources used for successive repetitions during uplink transmission of a data block regardless of whether there are other data blocks that need transmitting at the same time. The terminal device may thus be configured to operate according to a predefined scheme for automatically reducing the resources applied to retransmissions of a data block, i.e. so that re-transmissions are made to be less resource consuming than initial transmissions, thereby leaving more space (in terms of resources) for other data blocks that do become available for uplink before the retransmissions are complete.

Thus there has been described a method of transmitting blocks of data in a wireless telecommunications system in which blocks of data are transmitted a plurality of times to provide redundancy. When a first block of data becomes available for transmission an initial selection of transmission resources for a plurality of transmissions of the first block of data in a corresponding plurality of time periods is made, and transmissions of the first block of data are started. While there are still transmissions of the first block of data which remain to be made, a second block of data becomes available for transmission. In response to this, the initial selection of transmission resources for the remaining repeat transmissions of the first block of data is modified to increase the amount of resource available for transmitting the second block of data during the time periods in which repeat transmissions of the first block of data remain to be made. A selection of transmission resources for a plurality of transmissions of the second block of data in a corresponding plurality of time periods is made and the second block of data transmitted accordingly, and remaining transmissions for the first block of data are made in accordance with the modified selection of transmission resources for these transmissions of the first block of data.

It will be appreciated that while many of the above-described examples have focused on an uplink implementation, the principles set out in relation to uplink communications may also be used in respect of downlink communications. That is to say, in the general case these principles may be adopted in respect of communications between a transmitting entity (which in the majority of examples discussed above is a terminal device, but which in other examples could be network infrastructure equipment) and a receiving entity (which in the majority of examples discussed above is network infrastructure equipment, but which in other examples could be a terminal device).

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

Respective features of the present disclosure are defined by the following numbered paragraphs:

Paragraph 1. A method of transmitting blocks of data from a transmitter entity to a receiver entity in a wireless telecommunications system in which blocks of data are transmitted a plurality of times in a corresponding plurality of time periods using transmission resources in each time period selected from among available transmission resources for transmitting the blocks of data; wherein the method comprises: determining a first block of data has become available for transmission from the transmitter entity to the receiver entity; determining an initial selection of transmission resources for a plurality of transmissions of the first block of data in a corresponding plurality of time periods, wherein the plurality of transmissions for the first block of data comprise a first transmission and one or more repeat transmissions; beginning transmission of the first block of data using the initial selection of transmission resources; determining a second block of data has become available for transmission from the transmitter entity to the receiver entity before the plurality of transmissions for the first block of data are complete; modifying the initial selection of transmission resources for the time periods remaining for repeat transmissions of the first block of data to reduce the amount of transmission resources selected for repeat transmissions of the first block of data that have not yet been made, thereby increasing the amount of transmission resources remaining available for transmitting the second block of data during these remaining time periods for repeat transmissions of the first block of data; determining a selection of transmission resources for at least one transmission of the second block of data in a corresponding at least one time period which overlaps with the time periods remaining for repeat transmissions of the first block of data according to the initial selection of transmission resources for transmitting the first block of data; and transmitting the second block of data using the selection of transmission resources for the second block of data and transmitting remaining repeat transmissions for the first block of data in accordance with the modified selection of transmission resources for the first block of data.

Paragraph 2. The method of paragraph 1, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data is dependent on the number of transmissions of the first block of data that have already been made.

Paragraph 3. The method of paragraph 1 or 2, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data is dependent on the number of transmissions of the first block of data that will have already been made before the respective time periods.

Paragraph 4. The method of any of paragraphs 1 to 3, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data increases for subsequent repeat transmissions of the first block of data.

Paragraph 5. The method of any of paragraphs 1 to 4, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data is sufficient to allow at least one transmission of the second block of data to be made with an amount of transmission resources that has not been reduced to allow for a repeat transmission of the first block of data.

Paragraph 6. The method of any of paragraphs 1 to 5, wherein modifying the initial selection of transmission resources for the time periods remaining for repeat transmissions of the first block of data to reduce the amount of transmission resources selected for repeat transmissions of the first block of data that have not yet been made comprises cancelling one or more of the repeat transmissions of the first block of data that has not yet been made.

Paragraph 7. The method of any of paragraphs 1 to 6, wherein the transmission resources comprising the selection of transmission resources for the second block of data and the transmission resources comprising the modified selection of transmission resources for the first block of data are interleaved in the frequency domain.

Paragraph 8. The method of any of paragraphs 1 to 7, wherein the transmission resources comprising the selection of transmission resources for the second block of data and the transmission resources comprising the modified selection of transmission resources for the first block of data are interleaved in the time domain.

Paragraph 9. The method of any of paragraphs 1 to 8, wherein the available transmission resources from which the respective selections of transmission resources for transmitting the respective blocks of data are made comprises at least one of: a plurality of frequencies available for transmitting the blocks of data; plurality of time periods available for transmitting the blocks of data; an amount of power available for transmitting the blocks of data: a plurality of multiple input multiple output, MIMO, configurations available for transmitting the blocks of data; and a plurality of multiuser superposition transmission, MUST, configurations available for transmitting the blocks of data.

Paragraph 10. The method of any of paragraphs 1 to 9, further comprising the transmitter entity transmitting to the receiver entity an indication the initial selection of transmission resources for a plurality of transmissions of the first block of data has been modified.

Paragraph 11. The method of paragraph 10, wherein the indication is transmitted in a time period after the transmissions of the first block of data have been completed or wherein the indication is transmitted in a time period in which a first transmission of the second block of data is made.

Paragraph 12. The method of any of paragraphs 1 to 11, wherein at least one of the selections of transmission resources for transmitting the respective blocks of data is autonomously selected by the terminal device from among the available transmission resources.

Paragraph 13. The method of any of paragraphs 1 to 12, wherein at least one of the selections of transmission resources for transmitting the respective blocks of data is selected by the terminal device from among the available transmission resources based on resource allocation signalling received from the receiving entity for the blocks of data.

Paragraph 14. The method of any of paragraphs 1 to 13, wherein the transmitter entity comprises a terminal device and the receiver entity comprises wireless telecommunications network infrastructure equipment.

Paragraph 15. A transmitter entity for transmitting blocks of data to a receiver entity in a wireless telecommunications system in which blocks of data are transmitted a plurality of times in a corresponding plurality of time periods using transmission resources in each time period selected from among available transmission resources for transmitting the blocks of data, wherein the transmitter entity comprises controller circuitry and transceiver circuitry configured to operate together such that the transmitter entity is operable to: determine a first block of data has become available for transmission from the transmitter entity to the receiver entity; determine an initial selection of transmission resources for a plurality of transmissions of the first block of data in a corresponding plurality of time periods, wherein the plurality of transmissions for the first block of data comprise a first transmission and one or more repeat transmissions; begin transmission of the first block of data using the initial selection of transmission resources; determine a second block of data has become available for transmission from the transmitter entity to the receiver entity before the plurality of transmissions for the first block of data are complete; modify the initial selection of transmission resources for the time periods remaining for repeat transmissions of the first block of data to reduce the amount of transmission resources selected for repeat transmissions of the first block of data that have not yet been made, thereby increasing the amount of transmission resources remaining available for transmitting the second block of data during these remaining time periods for repeat transmissions of the first block of data; determine a selection of transmission resources for at least one transmission of the second block of data in a corresponding at least one time period which overlaps with the time periods remaining for repeat transmissions of the first block of data according to the initial selection of transmission resources for transmitting the first block of data; and transmit the second block of data using the selection of transmission resources for the second block of data and transmit remaining repeat transmissions for the first block of data in accordance with the modified selection of transmission resources for the first block of data.

Paragraph 16. A wireless telecommunications system comprising the transmitter entity of paragraph 15 and a receiver entity.

Paragraph 17. Circuitry for a transmitter entity for transmitting blocks of data to a receiver entity in a wireless telecommunications system in which blocks of data are transmitted a plurality of times in a corresponding plurality of time periods using transmission resources in each time period selected from among available transmission resources for transmitting the blocks of data, wherein the circuitry comprises controller circuitry and transceiver circuitry configured to operate together such that the circuitry is operable to: determine a first block of data has become available for transmission from the transmitter entity to the receiver entity; determine an initial selection of transmission resources for a plurality of transmissions of the first block of data in a corresponding plurality of time periods, wherein the plurality of transmissions for the first block of data comprise a first transmission and one or more repeat transmissions; begin transmission of the first block of data using the initial selection of transmission resources; determine a second block of data has become available for transmission from the transmitter entity to the receiver entity before the plurality of transmissions for the first block of data are complete; modify the initial selection of transmission resources for the time periods remaining for repeat transmissions of the first block of data to reduce the amount of transmission resources selected for repeat transmissions of the first block of data that have not yet been made, thereby increasing the amount of transmission resources remaining available for transmitting the second block of data during these remaining time periods for repeat transmissions of the first block of data; determine a selection of transmission resources for at least one transmission of the second block of data in a corresponding at least one time period which overlaps with the time periods remaining for repeat transmissions of the first block of data according to the initial selection of transmission resources for transmitting the first block of data; and transmit the second block of data using the selection of transmission resources for the second block of data and transmit remaining repeat transmissions for the first block of data in accordance with the modified selection of transmission resources for the first block of data.

Paragraph 18. A method of receiving blocks of data from a transmitter entity at a receiver entity in a wireless telecommunications system in which blocks of data are transmitted a plurality of times in a corresponding plurality of time periods using transmission resources in each time period selected from among available transmission resources for transmitting the blocks of data; wherein the method comprises: determining an initial selection of transmission resources for receiving a plurality of transmissions of a first block of data in a corresponding plurality of time periods, wherein the plurality of transmissions for the first block of data comprise a first transmission and one or more repeat transmissions; beginning reception of the first block of data using the initial selection of transmission resources; determining a modification to the initial selection of transmission resources for time periods remaining for repeat transmissions of the first block of data that reduces the amount of transmission resources for repeat transmissions of the first block of data that have not yet been made, thereby increasing the amount of transmission resources available for the transmitter entity to transmit a second block of data that has become available for transmission from the transmitter entity to the receiver entity; determining a selection of transmission resources for receiving at least one transmission of the second block of data in a corresponding at least one time period which overlaps with the time periods remaining for repeat transmissions of the first block of data according to the initial selection of transmission resources for transmitting the first block of data; and receiving the second block of data using the selection of transmission resources for the second block of data and receiving remaining repeat transmissions for the first block of data in accordance with the modified selection of transmission resources for the first block of data.

Paragraph 19. The method of Paragraph 18, the step of determining a modification to the initial selection of transmission resources comprises receiving from the transmitting entity an indication the initial selection of transmission resources for the plurality of transmissions of the first block of data has been modified.

Paragraph 20. A receiver entity for receiving blocks of data from a transmitter entity in a wireless telecommunications system in which blocks of data are transmitted a plurality of times in a corresponding plurality of time periods using transmission resources in each time period selected from among available transmission resources for transmitting the blocks of data; wherein the receiver entity comprises controller circuitry and transceiver circuitry configured to operate together such that the receiver entity is operable to: determine an initial selection of transmission resources for receiving a plurality of transmissions of a first block of data in a corresponding plurality of time periods, wherein the plurality of transmissions for the first block of data comprise a first transmission and one or more repeat transmissions; begin reception of the first block of data using the initial selection of transmission resources; determine a modification to the initial selection of transmission resources for time periods remaining for repeat transmissions of the first block of data that reduces the amount of transmission resources for repeat transmissions of the first block of data that have not yet been made, thereby increasing the amount of transmission resources available for the transmitter entity to transmit a second block of data that has become available for transmission from the transmitter entity to the receiver entity; determine a selection of transmission resources for receiving at least one transmission of the second block of data in a corresponding at least one time period which overlaps with the time periods remaining for repeat transmissions of the first block of data according to the initial selection of transmission resources for transmitting the first block of data; and receive the second block of data using the selection of transmission resources for the second block of data and receiving remaining repeat transmissions for the first block of data in accordance with the modified selection of transmission resources for the first block of data.

Paragraph 21. Circuitry for a receiver entity for receiving blocks of data from a transmitter entity in a wireless telecommunications system in which blocks of data are transmitted a plurality of times in a corresponding plurality of time periods using transmission resources in each time period selected from among available transmission resources for transmitting the blocks of data; wherein the circuitry comprises controller circuitry and transceiver circuitry configured to operate together such that the circuitry is operable to: determine an initial selection of transmission resources for receiving a plurality of transmissions of a first block of data in a corresponding plurality of time periods, wherein the plurality of transmissions for the first block of data comprise a first transmission and one or more repeat transmissions; begin reception of the first block of data using the initial selection of transmission resources; determine a modification to the initial selection of transmission resources for time periods remaining for repeat transmissions of the first block of data that reduces the amount of transmission resources for repeat transmissions of the first block of data that have not yet been made, thereby increasing the amount of transmission resources available for the transmitter entity to transmit a second block of data that has become available for transmission from the transmitter entity to the receiver entity; determine a selection of transmission resources for receiving at least one transmission of the second block of data in a corresponding at least one time period which overlaps with the time periods remaining for repeat transmissions of the first block of data according to the initial selection of transmission resources for transmitting the first block of data; and receive the second block of data using the selection of transmission resources for the second block of data and receiving remaining repeat transmissions for the first block of data in accordance with the modified selection of transmission resources for the first block of data.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN#71, Gothenburg, Sweden, 7 to 10. Mar., 2016
[2] Holma H. and Toskala A, "LTE for UMTS OFDMA and SC-FDMA based radio access", John Wiley and Sons, 2009
[3] 3GPP document TR36.859: Technical Specification Group Radio Access Network; "Study on Downlink Multiuser Superposition Transmission (MUST) for LTE"; (Release 13), November 2015

What is claimed is:

1. A method of transmitting blocks of data from a transmitter entity to a receiver entity in a wireless telecommunications system in which blocks of data are transmitted a plurality of times in a corresponding plurality of time periods using transmission resources in each time period selected from among available transmission resources for transmitting the blocks of data, the method comprising:
   determining a first block of data has become available for transmission from the transmitter entity to the receiver entity;
   determining an initial selection of transmission resources for a plurality of transmissions of the first block of data in a corresponding plurality of time periods, wherein the plurality of transmissions for the first block of data comprise a first transmission and one or more repeat transmissions;
   beginning transmission of the first block of data using the initial selection of transmission resources;
   determining a second block of data has become available for transmission from the transmitter entity to the receiver entity before the plurality of transmissions for the first block of data are complete;
   modifying the initial selection of transmission resources for time periods remaining for repeat transmissions of the first block of data to reduce the amount of transmission resources selected for repeat transmissions of the first block of data that have not yet been made, thereby increasing the amount of transmission resources remaining available for transmitting the second block of data during these remaining time periods for repeat transmissions of the first block of data;

determining a selection of transmission resources for at least one transmission of the second block of data in a corresponding at least one time period which overlaps with the time periods remaining for repeat transmissions of the first block of data according to the initial selection of transmission resources for transmitting the first block of data; and transmitting the second block of data using the selection of transmission resources for the second block of data and transmitting remaining repeat transmissions for the first block of data in accordance with the modified selection of transmission resources for the first block of data, wherein modifying the initial selection of transmission resources for the time periods remaining for repeat transmissions of the first block of data to reduce the amount of transmission resources selected for repeat transmissions of the first block of data that have not yet been made comprises cancelling one or more of the repeat transmissions of the first block of data that has not yet been made.

2. The method of claim 1, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data is dependent on the number of transmissions of the first block of data that have already been made.

3. The method of claim 1, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data is dependent on the number of transmissions of the first block of data that will have already been made before the respective time periods.

4. The method of claim 1, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data increases for subsequent repeat transmissions of the first block of data.

5. The method of claim 1, wherein the extent to which the amount of transmission resources for repeat transmissions of the first block of data in respective ones of the remaining time periods initially selected for transmission of the first block of data is reduced when modifying the initial selection of transmission resources for the time periods remaining for repeat transmissions of the first block of data is sufficient to allow at least one transmission of the second block of data to be made with an amount of transmission resources that has not been reduced to allow for a repeat transmission of the first block of data.

6. The method of claim 1, wherein the transmission resources comprising the selection of transmission resources for the second block of data and the transmission resources comprising the modified selection of transmission resources for the first block of data are interleaved in the frequency domain.

7. The method of claim 1, wherein the transmission resources comprising the selection of transmission resources for the second block of data and the transmission resources comprising the modified selection of transmission resources for the first block of data are interleaved in time domain.

8. The method of claim 1, wherein the available transmission resources from which the respective selections of transmission resources for transmitting the respective blocks of data are made comprises at least one of:
   a plurality of frequencies available for transmitting the blocks of data;
   a plurality of time periods available for transmitting the blocks of data;
   an amount of power available for transmitting the blocks of data:
   a plurality of multiple input multiple output, MIMO, configurations available for transmitting the blocks of data; and
   a plurality of multiuser superposition transmission, MUST, configurations available for transmitting the blocks of data.

9. The method of claim 1, further comprising the transmitter entity transmitting to the receiver entity an indication the initial selection of transmission resources for a plurality of transmissions of the first block of data has been modified.

10. The method of claim 9, wherein the indication is transmitted in a time period after the transmissions of the first block of data have been completed or wherein the indication is transmitted in a time period in which a first transmission of the second block of data is made.

11. The method of claim 1, wherein at least one of the selections of transmission resources for transmitting the respective blocks of data is autonomously selected by the terminal device from among the available transmission resources.

12. The method of claim 1, wherein at least one of the selections of transmission resources for transmitting the respective blocks of data is selected by the terminal device from among the available transmission resources based on resource allocation signaling received from the receiving entity for the blocks of data.

13. The method of claim 1, wherein the transmitter entity comprises a terminal device and the receiver entity comprises wireless telecommunications network infrastructure equipment.

14. A transmitter entity for transmitting blocks of data to a receiver entity in a wireless telecommunications system in which blocks of data are transmitted a plurality of times in a corresponding plurality of time periods using transmission resources in each time period selected from among available transmission resources for transmitting the blocks of data, the transmitter entity comprising:
   controller circuitry and transceiver circuitry configured to operate together such that the transmitter entity is configured to:
   determine a first block of data has become available for transmission from the transmitter entity to the receiver entity;
   determine an initial selection of transmission resources for a plurality of transmissions of the first block of data in a corresponding plurality of time periods, wherein the plurality of transmissions for the first block of data comprise a first transmission and one or more repeat transmissions;

begin transmission of the first block of data using the initial selection of transmission resources;

determine a second block of data has become available for transmission from the transmitter entity to the receiver entity before the plurality of transmissions for the first block of data are complete;

modify the initial selection of transmission resources for time periods remaining for repeat transmissions of the first block of data to reduce the amount of transmission resources selected for repeat transmissions of the first block of data that have not yet been made, thereby increasing the amount of transmission resources remaining available for transmitting the second block of data during these remaining time periods for repeat transmissions of the first block of data;

determine a selection of transmission resources for at least one transmission of the second block of data in a corresponding at least one time period which overlaps with the time periods remaining for repeat transmissions of the first block of data according to the initial selection of transmission resources for transmitting the first block of data; and transmit the second block of data using the selection of transmission resources for the second block of data and transmit remaining repeat transmissions for the first block of data in accordance with the modified selection of transmission resources for the first block of data, wherein the modifying the initial selection of transmission resources for the time periods remaining for repeat transmissions of the first block of data to reduce the amount of transmission resources selected for repeat transmissions of the first block of data that have not yet been made comprises cancelling one or more of the repeat transmissions of the first block of data that has not yet been made.

15. Circuitry for a transmitter entity for transmitting blocks of data to a receiver entity in a wireless telecommunications system in which blocks of data are transmitted a plurality of times in a corresponding plurality of time periods using transmission resources in each time period selected from among available transmission resources for transmitting the blocks of data, the circuitry comprising:

controller circuitry and transceiver circuitry configured to operate together such that the circuitry is configured to:

determine a first block of data has become available for transmission from the transmitter entity to the receiver entity;

determine an initial selection of transmission resources for a plurality of transmissions of the first block of data in a corresponding plurality of time periods, wherein the plurality of transmissions for the first block of data comprise a first transmission and one or more repeat transmissions;

begin transmission of the first block of data using the initial selection of transmission resources;

determine a second block of data has become available for transmission from the transmitter entity to the receiver entity before the plurality of transmissions for the first block of data are complete;

modify the initial selection of transmission resources for time periods remaining for repeat transmissions of the first block of data to reduce the amount of transmission resources selected for repeat transmissions of the first block of data that have not yet been made, thereby increasing the amount of transmission resources remaining available for transmitting the second block of data during these remaining time periods for repeat transmissions of the first block of data;

determine a selection of transmission resources for at least one transmission of the second block of data in a corresponding at least one time period which overlaps with the time periods remaining for repeat transmissions of the first block of data according to the initial selection of transmission resources for transmitting the first block of data; and transmit the second block of data using the selection of transmission resources for the second block of data and transmit remaining repeat transmissions for the first block of data in accordance with the modified selection of transmission resources for the first block of data, wherein modifying the initial selection of transmission resources for the time periods remaining for repeat transmissions of the first block of data to reduce the amount of transmission resources selected for repeat transmissions of the first block of data that have not yet been made comprises cancelling one or more of the repeat transmissions of the first block of data that has not yet been made.

* * * * *